US011868903B2

(12) United States Patent
Sweeney et al.

(10) Patent No.: US 11,868,903 B2
(45) Date of Patent: Jan. 9, 2024

(54) METHOD, SYSTEM, AND COMPUTER PROGRAM FOR USER-DRIVEN DYNAMIC GENERATION OF SEMANTIC NETWORKS AND MEDIA SYNTHESIS

(71) Applicant: Primal Fusion Inc., Waterloo (CA)

(72) Inventors: Peter Sweeney, Kitchener (CA); Robert Good, Waterloo (CA); Robert Barlow-Busch, Kitchener (CA); Alexander David Black, Guelph (CA)

(73) Assignee: PRIMAL FUSION INC., Kitchener (CA)

( * ) Notice: Subject to any disclaimer, the term of this patent is extended or adjusted under 35 U.S.C. 154(b) by 301 days.

(21) Appl. No.: 14/163,504

(22) Filed: Jan. 24, 2014

(65) Prior Publication Data
US 2014/0324765 A1    Oct. 30, 2014

Related U.S. Application Data

(63) Continuation of application No. 12/671,846, filed as application No. PCT/CA2009/000567 on May 1, 2009, now Pat. No. 8,676,722.
(Continued)

(51) Int. Cl.
*G06N 5/02*       (2023.01)
*G06F 16/36*      (2019.01)
(Continued)

(52) U.S. Cl.
CPC ......... *G06N 5/02* (2013.01); *G06F 16/24575* (2019.01); *G06F 16/3334* (2019.01);
(Continued)

(58) Field of Classification Search
CPC ........ G06N 5/02; G06N 99/005; G06N 5/025; G06N 7/005; G06K 9/6256; G06K 9/6269
See application file for complete search history.

(56) References Cited

U.S. PATENT DOCUMENTS 3,943,462 A   3/1976   Thompson
4,532,813 A   8/1985   Rinehart
(Continued)

FOREIGN PATENT DOCUMENTS

CA    2451737 A1    6/2005
CA    2734756 A1    3/2010
(Continued)

OTHER PUBLICATIONS

Canadian Office Action for Canadian Application No. 2723179 dated Jul. 6, 2015.
(Continued)

*Primary Examiner* — Luis A Sitiriche
(74) *Attorney, Agent, or Firm* — Own Innovation; Kent Howe; James W. Hinton

(57) ABSTRACT

This invention relates generally to classification systems. More particularly this invention relates to a system, method, and computer program to dynamically generate a domain of information synthesized by a classification system or semantic network. The invention discloses a method, system, and computer program providing a means by which an information store comprised of knowledge representations, such as a web site comprised of a plurality of web pages or a database comprised of a plurality of data instances, may be optimally organized and accessed based on relational links between ideas defined by one or more thoughts identified by an agent and one or more ideas embodied by the data instances. Such means is hereinafter referred to as a "thought network".

24 Claims, 8 Drawing Sheets

Related U.S. Application Data

(60) Provisional application No. 61/049,581, filed on May 1, 2008.

(51) Int. Cl.
  *G06F 16/33* (2019.01)
  *G06F 16/2457* (2019.01)
  *G06F 40/30* (2020.01)
  *G06Q 30/0241* (2023.01)
  *G06Q 30/0251* (2023.01)
  *G06N 5/022* (2023.01)

(52) U.S. Cl.
  CPC ........ *G06F 16/3344* (2019.01); *G06F 16/367* (2019.01); *G06F 40/30* (2020.01); *G06N 5/022* (2013.01); *G06Q 30/0241* (2013.01); *G06Q 30/0269* (2013.01)

(56) References Cited

U.S. PATENT DOCUMENTS

| | | |
|---|---|---|
| 4,972,328 A | 11/1990 | Wu et al. |
| 5,056,021 A | 10/1991 | Ausborn |
| 5,193,185 A | 3/1993 | Lanter |
| 5,369,763 A | 11/1994 | Biles |
| 5,745,910 A | 4/1998 | Piersol et al. |
| 5,774,888 A | 6/1998 | Light |
| 5,793,376 A | 8/1998 | Tanaka et al. |
| 5,835,758 A | 11/1998 | Nochur et al. |
| 5,911,145 A | 6/1999 | Arora et al. |
| 5,937,400 A | 8/1999 | Au |
| 5,953,726 A | 9/1999 | Carter et al. |
| 6,006,222 A | 12/1999 | Culliss |
| 6,061,695 A * | 5/2000 | Slivka ................. G06F 17/2241 715/203 |
| 6,078,916 A | 6/2000 | Culliss |
| 6,098,033 A | 8/2000 | Richardson et al. |
| 6,138,085 A | 10/2000 | Richardson et al. |
| 6,167,390 A | 12/2000 | Brady et al. |
| 6,173,276 B1 | 1/2001 | Kant et al. |
| 6,233,575 B1 | 5/2001 | Agrawal et al. |
| 6,292,792 B1 | 9/2001 | Beffes et al. |
| 6,295,066 B1 | 9/2001 | Tanizaki et al. |
| 6,334,131 B2 | 12/2001 | Chakrabarti et al. |
| 6,349,275 B1 | 2/2002 | Schumacher et al. |
| 6,356,899 B1 | 3/2002 | Chakrabarti et al. |
| 6,396,864 B1 | 5/2002 | O'Brien et al. |
| 6,401,061 B1 | 6/2002 | Zieman |
| 6,499,024 B1 | 12/2002 | Stier et al. |
| 6,539,376 B1 | 3/2003 | Sundaresan et al. |
| 6,539,395 B1 | 3/2003 | Gjerdingen et al. |
| 6,556,983 B1 | 4/2003 | Altschuler et al. |
| 6,571,240 B1 | 5/2003 | Ho et al. |
| 6,658,287 B1 | 12/2003 | Litt et al. |
| 6,694,329 B2 | 2/2004 | Murray |
| 6,751,611 B2 | 6/2004 | Krupin et al. |
| 6,751,621 B1 | 6/2004 | Calistri-Yeh et al. |
| 6,768,982 B1 | 7/2004 | Collins et al. |
| 6,772,136 B2 | 8/2004 | Kant et al. |
| 6,785,683 B1 | 8/2004 | Zodik et al. |
| 6,868,525 B1 | 3/2005 | Szabo |
| 6,976,020 B2 | 12/2005 | Anthony et al. |
| 6,980,984 B1 | 12/2005 | Huffman et al. |
| 7,007,074 B2 | 2/2006 | Radwin |
| 7,035,864 B1 | 4/2006 | Ferrari et al. |
| 7,051,023 B2 | 5/2006 | Kapur et al. |
| 7,062,466 B2 | 6/2006 | Wagner et al. |
| 7,062,483 B2 | 6/2006 | Ferrari et al. |
| 7,076,503 B2 | 7/2006 | Platt et al. |
| 7,089,237 B2 | 8/2006 | Turnbull et al. |
| 7,120,646 B2 | 10/2006 | Streepy, Jr. |
| 7,152,065 B2 | 12/2006 | Behrens et al. |
| 7,181,465 B2 | 2/2007 | Maze et al. |
| 7,209,922 B2 | 4/2007 | Maze et al. |
| 7,225,183 B2 | 5/2007 | Gardner |
| 7,249,117 B2 | 7/2007 | Estes |
| 7,280,991 B1 | 10/2007 | Beams et al. |
| 7,283,992 B2 | 10/2007 | Liu et al. |
| 7,302,418 B2 | 11/2007 | Asahara |
| 7,319,951 B2 | 1/2008 | Rising, III et al. |
| 7,376,632 B1 * | 5/2008 | Sadek ................... G06N 5/043 706/11 |
| 7,392,250 B1 | 6/2008 | Dash et al. |
| 7,406,456 B2 | 7/2008 | Calistri-Yeh et al. |
| 7,418,452 B2 | 8/2008 | Maze |
| 7,437,370 B1 * | 10/2008 | Ershov ............. G06F 17/30899 707/999.01 |
| 7,440,940 B2 | 10/2008 | Chen et al. |
| 7,478,089 B2 | 1/2009 | Henkin et al. |
| 7,490,073 B1 | 2/2009 | Qureshi et al. |
| 7,493,319 B1 | 2/2009 | Dash et al. |
| 7,496,593 B2 | 2/2009 | Gardner et al. |
| 7,502,810 B2 | 3/2009 | Acevedo-Aviles et al. |
| 7,580,918 B2 | 8/2009 | Chang et al. |
| 7,596,374 B2 | 9/2009 | Katou |
| 7,596,574 B2 | 9/2009 | Sweeney |
| 7,606,168 B2 | 10/2009 | Robinson et al. |
| 7,606,781 B2 | 10/2009 | Sweeney et al. |
| 7,627,582 B1 | 12/2009 | Ershov |
| 7,668,737 B2 | 2/2010 | Streepy, Jr. |
| 7,711,672 B2 | 5/2010 | Au |
| 7,716,207 B2 | 5/2010 | Odom et al. |
| 7,716,216 B1 | 5/2010 | Harik et al. |
| 7,720,857 B2 | 5/2010 | Beringer et al. |
| 7,752,199 B2 | 7/2010 | Farrell |
| 7,752,534 B2 | 7/2010 | Blanchard, III et al. |
| 7,827,125 B1 | 11/2010 | Rennison |
| 7,844,565 B2 | 11/2010 | Sweeney |
| 7,849,090 B2 | 12/2010 | Sweeney |
| 7,860,817 B2 | 12/2010 | Sweeney et al. |
| 7,945,555 B2 | 5/2011 | Sankaran et al. |
| 7,970,764 B1 | 6/2011 | Ershov |
| 8,010,570 B2 | 8/2011 | Sweeney |
| 8,281,238 B2 | 10/2012 | Sweeney et al. |
| 2002/0069197 A1 | 6/2002 | Katayama et al. |
| 2002/0078044 A1 | 6/2002 | Song et al. |
| 2002/0133483 A1 | 9/2002 | Klenk et al. |
| 2002/0194187 A1 | 12/2002 | McNeil et al. |
| 2003/0177112 A1 | 9/2003 | Gardner |
| 2003/0196094 A1 | 10/2003 | Hillis et al. |
| 2003/0217023 A1 | 11/2003 | Cui et al. |
| 2003/0217335 A1 | 11/2003 | Chung et al. |
| 2004/0024739 A1 | 2/2004 | Cooperman et al. |
| 2004/0049522 A1 | 3/2004 | Streepy, Jr. |
| 2004/0117335 A1 * | 6/2004 | Cuddihy ................ G06N 5/025 706/45 |
| 2005/0010428 A1 | 1/2005 | Bergeron et al. |
| 2005/0065955 A1 | 3/2005 | Babikov et al. |
| 2005/0086188 A1 | 4/2005 | Hillis et al. |
| 2005/0149518 A1 | 7/2005 | Duan et al. |
| 2005/0154708 A1 | 7/2005 | Sun |
| 2005/0192926 A1 * | 9/2005 | Liu ........................ G06N 5/02 707/999.001 |
| 2005/0209874 A1 | 9/2005 | Rossini |
| 2005/0216335 A1 | 9/2005 | Fikes et al. |
| 2005/0223109 A1 | 10/2005 | Mamou et al. |
| 2005/0289524 A1 | 12/2005 | McGinnes |
| 2006/0010117 A1 | 1/2006 | Bonabeau et al. |
| 2006/0026147 A1 | 2/2006 | Cone et al. |
| 2006/0026203 A1 | 2/2006 | Tan |
| 2006/0053172 A1 | 3/2006 | Gardner et al. |
| 2006/0074980 A1 | 4/2006 | Sarkar |
| 2006/0085489 A1 | 4/2006 | Tomic et al. |
| 2006/0129906 A1 | 6/2006 | Wall |
| 2006/0150215 A1 * | 7/2006 | Wroblewski .......... G06F 3/0481 725/47 |
| 2006/0153083 A1 | 7/2006 | Wallenius |
| 2006/0195407 A1 * | 8/2006 | Athelogou ............... G06N 5/02 706/12 |
| 2006/0242564 A1 | 10/2006 | Egger et al. |
| 2006/0271520 A1 | 11/2006 | Ragan |
| 2007/0033531 A1 | 2/2007 | Marsh |
| 2007/0036440 A1 | 2/2007 | Schaepe et al. |
| 2007/0038500 A1 | 2/2007 | Hammitt et al. |

(56) References Cited

U.S. PATENT DOCUMENTS

| | | |
|---|---|---|
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094006 A1 | 4/2007 | Todhunter |
| 2007/0094221 A1 | 4/2007 | Au |
| 2007/0106658 A1 | 5/2007 | Ferrari et al. |
| 2007/0118542 A1* | 5/2007 | Sweeney ............... G06F 16/84 707/999.1 |
| 2007/0124320 A1 | 5/2007 | Stuhec |
| 2007/0136221 A1 | 6/2007 | Sweeney et al. |
| 2007/0143300 A1 | 6/2007 | Gulli et al. |
| 2007/0174041 A1 | 7/2007 | Yeske |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0260520 A1* | 11/2007 | Jha ..................... G06Q 30/0274 705/14.44 |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004864 A1 | 1/2008 | Gabrilovich et al. |
| 2008/0021925 A1 | 1/2008 | Sweeney |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1 | 11/2008 | Calistri-Yeh et al. |
| 2008/0294584 A1 | 11/2008 | Herz |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0037261 A1 | 2/2009 | Won Cho |
| 2009/0055342 A1 | 2/2009 | Gong et al. |
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |

FOREIGN PATENT DOCUMENTS

| | | |
|---|---|---|
| CN | 1395193 A | 2/2003 |
| CN | 1650327 A | 8/2005 |
| CN | 1853180 A | 10/2006 |
| EP | 0 962 873 A1 | 12/1999 |
| EP | 2 300 966 | 3/2011 |
| JP | H09-114668 A | 5/1997 |
| JP | 2004334602 A | 11/2004 |
| JP | 2005-135311 A | 5/2005 |
| JP | 2005-514673 A | 5/2005 |
| JP | 2006-525602 A | 11/2006 |
| WO | WO 02/054292 A2 | 7/2002 |
| WO | 2004066175 A1 | 8/2004 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | 2008025167 A1 | 3/2008 |
| WO | WO 2008/025167 A1 | 3/2008 |
| WO | WO 2008/076438 A1 | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

Chinese Office Action for Chinese Application No. 200980115650.8 dated Mar. 12, 2013.
Chinese Office Action for Chinese Application No. 200780032062. 9, dated May 17, 2011.
Japanese Office Action for Japanese Application No. 2011-506541 dated Aug. 6, 2013.
Japanese Office Action for Japanese Application No. 2011-506541 dated Dec. 3, 2013.
Japanese Office Action for Japanese Application No. 2014-085995 dated Feb. 3, 2015.
Japanese Office Action for Japanese Application No. 2014-085995 dated Dec. 15, 2015.

(56) References Cited

OTHER PUBLICATIONS

International Preliminary Report on Patentability for International application No. PCT/CA2010/001772, dated May 24, 2012.
International Preliminary Report on Patentability for PCT/CA2007/001546 dated Dec. 19, 2008.
International Preliminary Report on Patentability for PCT/CA2009/000567 dated Nov. 11, 2010.
International Preliminary Report on Patentability for PCT/CA2009/001185 dated Mar. 10, 2011.
International Preliminary Report on Patentability for PCT/CA2010/001382 dated Mar. 22, 2012.
International search report and written opinion for International application No. PCT/CA2010/001772, dated Apr. 28, 2011.
International Search Report and Written Opinion for International Application No. PCT/CA2010/001382 dated Jan. 13, 2011.
International Search Report and Written Opinion for International Application No. PCT/CA2011/000718 dated Oct. 13, 2011.
International Search Report and Written Opinion for International Application No. PCT/CA2011/000745 dated Sep. 22, 2011.
International Search Report and Written Opinion for International Application No. PCT/CA2011/001382 dated Apr. 24, 2012.
International Search Report and Written Opinion for International Application No. PCT/CA2011/001403 dated May 23, 2012.
International Search Report and Written Opinion for PCT/CA2007/001546 dated Dec. 28, 2007.
International Search Report and Written Opinion for PCT/CA2009/000567 dated Aug. 24, 2009.
International Search Report and Written Opinion for PCT/CA2009/001185 dated Dec. 3, 2009.
International Search Report and Written Opinion of the International Searching Authority for International Application No. PCT/CA2011/000719, dated Sep. 28, 2011.
International Search Report and Written Opinion of the International Searching Authority for International Application No. PCT/CA2011/001402, dated Apr. 24, 2012.
International Search Report and Written Opinion of the International Searching Authority for International Application No. PCT/CA2012/000007, dated Apr. 20, 2012.
International Search Report and Written Opinion of the International Searching Authority for International Application No. PCT/CA2012/000009, dated May 1, 2012.
Interview Summary for U.S. Appl. No. 11/469,258 dated Dec. 16, 2008.
Advisory Action for U.S. Appl. No. 12/441,100 dated May 4, 2012.
Office Action for U.S. Appl. No. 11/469,258 dated Aug. 21, 2008.
Office Action for U.S. Appl. No. 12/555,222 dated Jan. 27, 2012.
Office Action for U.S. Appl. No. 12/555,222 dated Oct. 31, 2012.
Office Action for U.S. Appl. No. 12/555,341 dated Aug. 1, 2012.
Office Action for U.S. Appl. No. 12/555,341 dated Feb. 9, 2012.
Office Action for U.S. Appl. No. 12/615,703 dated Feb. 1, 2012.
Office Action for U.S. Appl. No. 12/671,846 dated Feb. 14, 2013.
Office Action for U.S. Appl. No. 12/671,846 dated Oct. 25, 2013.
Office Action for U.S. Appl. No. 13/105,890 dated Jun. 26, 2012.
Office Action for U.S. Appl. No. 11/550,457 dated Dec. 15, 2008.
Office Action for U.S. Appl. No. 11/625,452 dated Dec. 7, 2009.
Office Action for U.S. Appl. No. 11/625,452 dated Mar. 26, 2010.
Office Action for U.S. Appl. No. 11/625,452 dated Mar. 30, 2009.
Office Action for U.S. Appl. No. 12/441,100 dated Jan. 24, 2012.
Office Action for U.S. Appl. No. 12/441,100 dated Jun. 9, 2011.
Office Action for U.S. Appl. No. 12/477,977 dated Sep. 28, 2010.
Office Action for U.S. Appl. No. 12/477,994 dated Aug. 31, 2010.
Office Action for U.S. Appl. No. 12/549,812 dated Oct. 1, 2012.
Office Action for U.S. Appl. No. 12/556,349 dated Jun. 29, 2010.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.

Blei et al., Hierarchical Bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia—based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilistic justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (Bayes) at forty: The independence assumption in information retrieval. Lecture Notes in Computer Science. 1998;1398:4-15.
Ma et al., Semantic Information Extraction of Video Based on Ontology and Inference. ICSC 2007. International Conference on Semantic Computing. 2007;1:721-726. Digital Object Identifier: 10.1109/ICSC.2007.12.
Metzler et al., A Markov random field model for term dependencies. Proceedings of SIGIR. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.
Seco et al., An intrinsic information content metric for semantic similarity in wordnet. Proceedings of 16th European Conference on Artificial Intelligence. 2004;1089-90.
Slavic et al., Core Requirements for Automation of Analytico—Synthetic Classifications. Advances in Knowledge Organization. 2004;9:187-192.
Song et al., A conceptual graph approach to semantic similarity computation method for e-service discovery. International Journal on Knowledge Engineering and Data Mining. 2010;1(1):50-68.

(56) References Cited

OTHER PUBLICATIONS

Storey, Comparing Relationships in Conceptual Modeling: Mapping to Semantic Classifications. IEEE Transactions on Knowledge and Data Engineering. 2005;17(11):1478-1489. Digital Object Identifier: 10.1109.

Terra et al., Frequency estimates for statistical word similarity measures. Proceedings of 2003 Conference of the North American Chapter of the Association for Computational Linguistics on Human Language Technology. 2003:165-172.

Wang et al., Gene expression correlation and gene ontology-based similarity: An assessment of quantitative relationships. Proceedings of IEEE Symposium on Computational Intelligence in Bioinformatics and Computational Biology. 2004:25-31.

Wu et al., Interpreting tf-idf term weights as making relevance decisions. ACM Transactions on Information Systems. 2008;26(3):Article No. 13.

Yamada et al., Case-Base Structure Incorporated with Attribute Set in Concept Hierarchy. IPSJ Sig Notes. 1997;97(81):33-38.

Zhai, Statistical language models for information retrieval—a critical review. Foundations and Trends in Information Retrieval. 2008;2(3):137-213.

Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.

The State Intellectual Property Office of China, Board Opinion for CN Application No. 200980115650.8 dated Nov. 4, 2016.

CIPO, Examiner's Requisition for CA Application No. 2,723,179 dated Jul. 21, 2016.

Ozaki et al., "Text Generation Using Semantic Network", The Information Processing Society of Japan, Jul. 25, 1997, vol. 97, No. 69, 133-140.

CNIPA, Search Report and Office Action for CN Application No. 201710064581.9 dated Oct. 31, 2018.

CNIPA, Office Action for CN Application No. 2017100645819 dated Dec. 4, 2019.

\* cited by examiner

METHOD, SYSTEM, AND COMPUTER PROGRAM FOR USER-DRIVEN DYNAMIC GENERATION OF SEMANTIC NETWORKS AND MEDIA SYNTHESIS

CROSS-REFERENCE TO RELATED APPLICATIONS

This application is a continuation of U.S. patent application Ser. No. 12/671,846, entitled "Method, System, And Computer Program For User-Driven Dynamic Generation Of Semantic Networks And Media Synthesis" and filed on Feb. 2, 2010, which is incorporated herein by reference in its entirety. U.S. patent application Ser. No. 12/671,846 is a U.S. National Stage entry of International Application Serial No. PCT/CA2009/000567, entitled "Method, System, And Computer Program For User-Driven Dynamic Generation Of Semantic Networks And Media Synthesis" and filed on May 1, 2009, which claims priority to U.S. Provisional Application No. 61/049,581, filed on May 1, 2008.

FIELD OF THE INVENTION

This invention relates generally to classification systems. More particularly this invention relates to a system, method, and computer program to dynamically generate a domain of information synthesized by a classification system or semantic network and to facilitate media synthesis.

BACKGROUND OF THE INVENTION

Semantic networks are often used as forms of knowledge representation. A semantic network is a directed graph consisting of vertices, which represent concepts, and edges, which represent semantic relations between the concepts.

In contrast to a network object, a networking activity comprises the active creation and reorganization of networks. Social networking is one example of a networking activity, wherein a network of acquaintances is built and revised. Members can use such a network to facilitate active interactions with other members. These networking interactions can result in changes to the network.

Whereas semantic networks are directed graphs, semantic networking is the process of developing those graphs.

It has generally been a challenge to those skilled in the art to create representations of abstract knowledge for mass market, consumer-focused activities. One reason for this is that the subject matter of a semantic network in consumer markets is often highly subjective and personal. Unlike organizational settings, it cannot be prescribed or given a universal representation for individual consumers.

In addition, knowledge entities are multifaceted; that is, they can have many different organizational bases (or dimensions). As the number of dimensions increases beyond three or four, representations of multidimensional objects, matrices, or networks quickly become too unwieldy for the cognitive abilities of human users. This problem is compounded when combining the representations of one person with those of others, because each person will have his or her own unique perspectives and vocabularies.

Another difficulty is that of scalability: thoughts and knowledge are unbounded, and representing them poses problems of storage and management.

Furthermore, semantic networking requires a process to guide it. Cognitive agents such as people may direct the production of knowledge representations, but the process must be mediated to be effective. Current approaches of doing so include: ontology-building and taxonomy-building tools; semantic web and collective knowledge initiatives; folksonomies (such as social tagging); semantic extraction (from legacy representations of knowledge); data mining; and others. These approaches require users to modify or accommodate their thinking in support of the technology. To be more effective, the system design should be directed by how people think.

Clearly, semantic networking processes are quite different than, for example, the general notion of semantic networks, which as previously mentioned are merely representations of a state of knowledge. Semantic networks have a broad utility as a form of knowledge representation. As machine-readable data, they can support a number of advanced technologies, such as artificial intelligence, software automation and "agents", expert systems, and knowledge management. Additionally, they can be transformed into various forms of media (other knowledge representations). In other words, the synthesis or creation of semantic networks can support the synthesis of a broad swath of media to extract additional value from the semantic network.

Some approaches to synthesize media are presently known. For example, NLP/grammar-based/linguistic document structure analysis is utilized as a lattice for collating content components and deducting component linking and alignment to form synthesized media. Additionally, multi-document summarization method is known, whereby common and diverse elements are captured across a number of documents, and merges or organizes these under a common these. Another approach involves utilizing a single super-document (e.g. a content model) and applying document transformations, for example, such as XSLT or XSD, to synthesize smaller subsets of documents. Still another known approach is synthesis in response to a complex specification from a user whereby user requirements are modelled, either implicitly, for example, such as demographic profiles, or explicitly, for example, such as by specific topics or perspectives, to provide a basis for synthesis operations. Other known approaches include social/collaborative/Web 2.0.

The above-listed methods do not provide options for consumers of media to direct the synthesis process. Consumers requiring personally tailored media must either create the document from scratch or use synthesizing approaches that are based upon existing documents or sources.

SUMMARY OF THE INVENTION

In one aspect of the present invention a computer implemented method for generating a semantic network is provided, characterized in that it comprises the steps of: (a) providing an information domain; (b) representing the information domain as a data set, the data set being defined by data entities and one or more relationships between the data entities; (c) providing, by means of an agent, data representing one or more thoughts; and (d) synthesizing, or facilitating the synthesizing, by one or more computer processors, a semantic network based on one or more interactions between the data entities and the one or more thoughts.

In another aspect of the present invention a computer system for generating a semantic network is provided, characterized in that it comprises: (a) one or more computers configured to provide, or provide access to, an information domain, wherein a data set is operable to represent the information domain, the data set being defined by data entities and one or more relationships between the data entities, and wherein an agent is operable to provide data representing one or more thoughts; and (b) a thought processor operable to synthesize, or facilitate the synthesis of, by one or more computer processors, a semantic network based on one or more interactions between the data entities and the one or more thoughts.

In yet another aspect of the present invention a computer program product for enabling the generation of a semantic network accessible through a web interface that enables an agent to initiate one or more computers to generate the semantic network is provided, the computer program product characterized in that the computer program product comprises computer instructions and data for configuring one or more computer processors to: (a) obtain, or obtain access to, an information domain, the information domain being represented by a data set representing the information domain, the data set being defined by data entities and one or more relationships between the data entities, wherein an agent is operable to provide data representing one or more thoughts; and (b) synthesize, or facilitate the application of, by a thought processor, a semantic network based on one or more interactions between the data entities and the one or more thoughts.

In a still other aspect of the present invention a computer implemented method for synthesizing media utilizing a semantic network is provided, characterized in that it comprises the steps of: (a) generating, or facilitating the generation of, by one or more computer processors, a thought network based on one or more interactions between one or more data entities and one or more thoughts; and (b) transforming the thought network so as to generate and provide one or more forms of synthesized media to a consumer.

In a further aspect of the present invention a method for generating a semantic network is provided, characterized in that it comprises the steps of: (a) providing an information domain; (b) representing the information domain as a data set, the data set being defined by data entities and one or more relationships between the data entities; (c) an agent providing data representing one or more thoughts; and (d) synthesizing a semantic network based on one or more interactions between the data entities and the one or more thoughts.

In a yet further aspect of the present invention a system for generating a semantic network is provided, characterized in that it comprises: (a) an information domain; (b) a data set operable to represent the information domain, the data set being defined by data entities and one or more relationships between the data entities; (c) an agent operable to provide data representing one or more thoughts; and (d) a semantic network, the semantic network synthesized based on one or more interactions between the data entities and the one or more thoughts.

In a still further aspect of the present invention a computer program for enabling generation of a semantic network is provided, the computer program characterized in that it comprises computer instructions, which when loaded on a server computer connected to the Internet are operable to provide a web application defining an interface that enables an agent to initiate the server computer to generate the semantic network by: (a) providing an information domain; (h) representing the information domain as a data set, the data set being defined by data entities and one or more relationships between the data entities; (c) the agent providing data representing one or more thoughts; and (d) synthesizing a semantic network based on one or more interactions between the data entities and the one or more thoughts.

In an additional aspect of the present invention a method for generating synthesized media utilizing a semantic network is provided, the method comprising: (a) generating the semantic network by the steps of: (i) providing an information domain; (ii) representing the information domain as a data set, the data set being defined by data entities and one or more relationships between the data entities; (iii) an agent providing data representing one or more thoughts; and (iv) synthesizing a semantic network based on one or more interactions between the data entities and the one or more thoughts; (b) generating the synthesized media by a transformation of the semantic network; and (c) providing the synthesized media to the agent.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
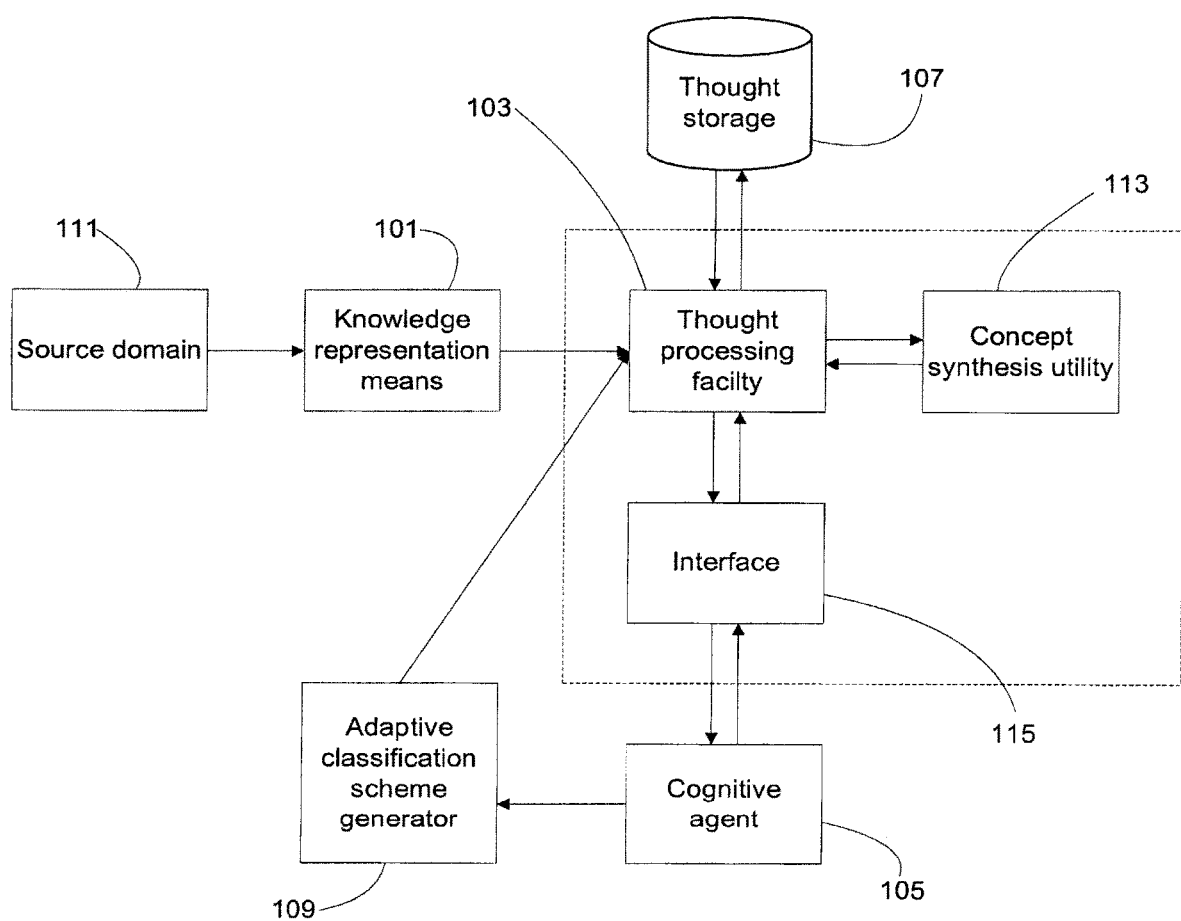
FIG. 1 illustrates one implementation of the components required to generate and use a thought network.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present invention, in one aspect thereof, provides a system, method and computer program for the automatic creation of semantic networks and thought networks. The present invention, in another aspect thereof, also provides a system and method for providing the broad requirements for semantic networking, including: (1) a way to digitally represent abstract thoughts; (2) the means to store and recall thoughts (as digital memories); (3) the means to contextualize thoughts within a timely and relevant perspective, linking them to other thoughts within the same perspective (a semantic network); (4) the means to direct those representations of thoughts to specific tasks; and (5) the means to economically store what is learned, to be used for future iterations of semantic networking.

The present invention, in yet another aspect thereof, facilitates a method, system and computer program whereby a media consumer may direct media synthesis to produce one or more tailored documents. In this manner the consumer may personally direct the synthesis process, so that it involves the direct contribution and insights of the individual consumer. The result produced may be personally tailored media. The present invention offers a hybrid solution whereby individual consumers may be the sole author and voice directing the creation of media and its content, and this process may be facilitated by machine-media synthesis which can gather a wide range of documents and document sources and further accelerate the process beyond that which is possible by other means. The result of the hybrid solution may be synthesized media or documents that are unique to each consumer and are not constrained by the boundaries and limits imposed by documents, media sources, and known media synthesis approaches.

Overview of Semantic and Thought Networks

The present invention, in one aspect thereof, discloses a method, system, and computer program providing a means by which an information store comprised of knowledge representations, for example a web site comprised of a plurality of web pages or a database comprised of a plurality of data instances, may be optimally organized and accessed based on relational links between ideas defined by one or more thoughts identified by an agent and one or more ideas embodied by the data instances. Such means is hereinafter referred to as a "thought network".

Like semantic networking, thought processing is defined by the dynamism of interactions, by the active creation and reshuffling of semantic networks. A "thought processor" may provide this role of processing thoughts to create dynamic, evolving thought networks, or a network comprised of a synthesized domain of information. As new representations of thoughts enter the system, the thought processor may use the new information to infer new thoughts and new connections between thoughts. Unlike existing reasoning and inference engines, a thought processor in accordance with the present invention may draw inferences in the production of semantic networks (creating both nodes and edges), to complement reasoning across existing semantic networks. To accomplish this, a thought processor may integrate the knowledge representations (thought data) with the inputs of cognitive agents (including, for example, people).

Once created, semantic (thought) networks can be put to many uses. Thought networking may address at least three broad classes of activities, including: (1) providing a means to acquire, store, and recall thoughts; (2) providing a means to generate highly personalized, contextualized, and utilitarian thought networks as they are needed to do work; and (3) providing software agents to get those jobs done as they consume the thought networks that have been created.

These thought networks may be useful for several reasons. For example, they can be used to navigate a website that is based on information derived from thought networking thereby enabling Internet searching, aiding in shopping, enabling documents to be outlined, supporting the creation of social networks to be created, etc. The role of software agents may include, but is not limited to: providing data for query-builders that search and retrieve information from the Internet; acting as a shopping agent to locate products that fit specific criteria; outlining documents by representing a semantic network as a document and populating it with content retrieved from different domains; and creating social networks by looking for intersections of thoughts in the semantic networks generated by different people.

FIG. 1 illustrates one implementation of the components required to generate and use a thought network.

In one implementation of the present invention, generation of a thought network occurs by means of the following components: a means of knowledge representation 101, a thought processing facility 103, the use of cognitive agents 105, a thought storage means 107, and an adaptive classification scheme generator 109. Each of these components is described below. Novel representative implementations are described for each component, but a person skilled in the art would recognize that other known implementations of the components may provide for operation of the overall system of the present invention. It should be noted that each of the components may, but need not necessarily, operate simultaneously, to dynamically and optimally refine a thought network.

In another aspect of the present invention, the generation and use of a thought network is enabled in particular by a thought processing facility 103, which is best understood as an implementation of a build engine, for example the build engine described in PCT application PCT/CA2007/001546. The thought processing facility 103 may be linked to a means of concept synthesis 113 also described in PCT application PCT/CA2007/001546. An interface 115 may also be provided for enabling cognitive agents 105 to interact with the thought processing facility 103 in accordance with the processes more fully described below.

In order to distil an information store (or source domain 111) to its knowledge representations, it may first be necessary to abstract the information to a conceptual, semantic representation. A process of information abstraction may be referred to as "knowledge representation".

The means of knowledge representation 101 may comprise a physical representation of abstract thoughts. In the context of the present invention, a specific and elemental unit of knowledge may be represented and optionally encoded (in one aspect, the elemental unit may be the absolute smallest unit of knowledge available). The artifacts produced by the knowledge representation means may use various media that represent thoughts, for example web pages, RSS feeds, RDF graphs, etc. These media may provide for thought interactions that are processed by other components of the system of the present invention. The media may then be monetized through a wide variety of revenue models: advertising, subscriptions, transactional micro-payments, etc. as taught by the present invention.

Once the units of knowledge have been represented, a thought processing facility 103 may then provide a means of concept synthesis 113. Similar to certain embodiments of social networking, thought processing may be defined by the dynamism of interactions resulting in the active creation and reshuffling of networks (again, thought processing may be quite different than, for example, the notion of "semantic networks", which is generally a largely static representation of knowledge). A thought processing facility 103 may process thoughts to create dynamic, evolving networks. As new representations of thoughts enter the system, the thought processing facility 103 may utilize the new information to infer new thoughts and new connections between thoughts. Unlike existing reasoning and inference engines, a thought processing facility 103 may be required to draw inferences in the production of semantic networks (creating both nodes and edges, for example), to complement reasoning across existing semantic networks. To accomplish this, a thought processing facility 103 may be required to integrate the knowledge representations (thought data) with the inputs of cognitive agents 105 (also referred to in this disclosure as "agents"), which may be people, machine-based expert systems, etc. The thought processing facility 103 may augment and speed the "thinking" of the cognitive agents 105.

The cognitive agents 105, which may be people, machine-based expert systems, etc., may provide the inputs of pattern recognition and selection that may refine and optimize thought networks over time. In addition to the media produced by the thought networks, cognitive agents 105 may also be the beneficiaries of value creation, through benefits such as enhanced recall or memory, creativity, and associative thinking. Like the media created, these benefits may be monetized through licensing, subscriptions, etc.

A thought storage means 107 for storing elemental and relational information may be provided in order to deal with increasingly high numbers and scales of thought networks. The thought storage means 107 may comprise a compression facility and an optimization facility that may selectively synthesize thought networks only as needed. Like memories that are brought into focus, acted upon, and then fade away, digital thoughts may need to be retrieved, synthesized into networks to create tangible artifacts such as media, and then disbanded. The thought storage means 107 in the present description teaches a data model used in conjunction with a system of analysis that may be used to integrate thoughts from different domains.

An adaptive classification scheme generator 109 may be used to represent knowledge within specific domains, providing a foundation for reasoning about the concepts. A challenge in generating classification schemes and ontologies is that they must be crafted for specific domains and the cognitive agents that are acting within them. Thoughts may be highly subjective, intensively personal, and often private. Thus the adaptive classification scheme generator 109 may define the scope and application of the type of networks one may create. In the present disclosure, a component for generating highly personalized and domain-specific classification schemes is taught, which may provide the infrastructure for a range of general purpose applications. This component may also function with the thought data stores to integrate thought networks across people and domains, providing the means to recall thoughts, synthesize thought networks as needed, and collapse the networks once the benefits have been culled from it.

Knowledge Representation

In the context of the present invention, knowledge may be represented in several ways known to those skilled in the art. What may be required is a means by which thoughts may be connected such that the thought processor of the present invention may synthesize a network of relationships between the thoughts. The following describes one novel approach of generating a representation of thoughts previously described in PCT application PCT/CA2007/001546, but the thought processor of the present invention may be operable with any representation of thoughts.

Summary of Knowledge Representation Model

For simplicity, the knowledge representation model described in PCT application PCT/CA2007/001546 will be used to explain the novel approach to generating the representation described by the present invention.

A knowledge representation model may include knowledge representation entities, relationships, and methods of transformation.

Entities

Figure 2:
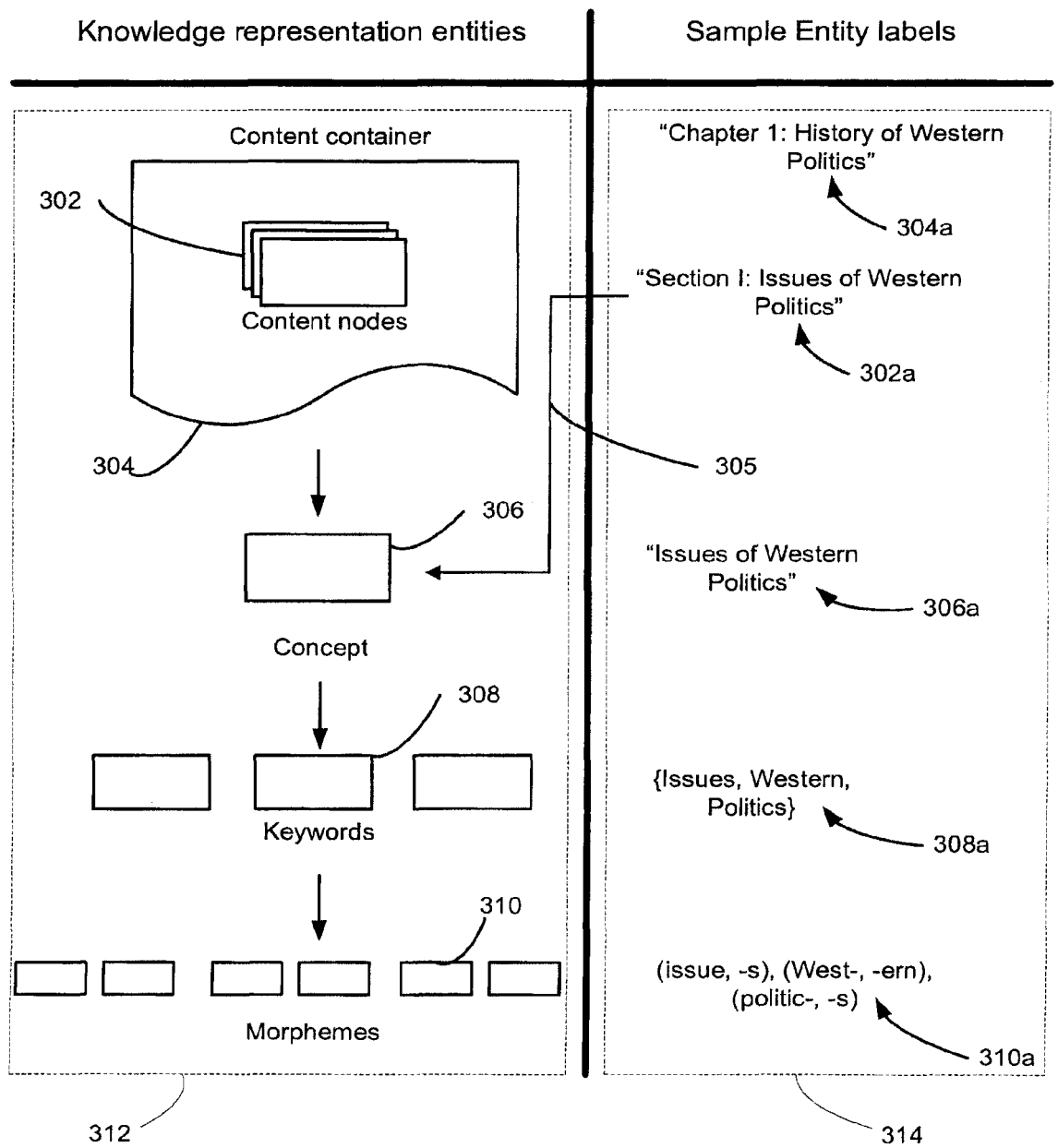
FIG. 2 illustrates knowledge representation entities and relationships in one implementation of the invention.

FIG. 2 illustrates knowledge representation entities and relationships in one implementation of the invention. For purposes of illustration only, and without limiting the present invention, FIG. 2 also shows sample entity labels 314 in accordance with the knowledge representation entities and relationships 312. The entities may include a set of content nodes 302, a set of content containers 304, a set of concepts 306 (to simplify the illustration, only one concept is presented in FIG. 2), a set of keywords 308, and a set of morphemes 310.

The informational space to be included may be referred to as a domain. A domain may comprise a broad field of interest into which knowledge is divided, and around which boundaries are set.

A domain may be defined without knowing precisely or exhaustively what it contains. The present invention may be used to examine or work over any number of domains. At any particular time, however, it may operate within one selected domain. This may be referred to as the active domain.

The objects of the domain to be classified may be referred to as content nodes 302. Content nodes may be comprised of any objects that are amenable to classification, for example a file, a document, a portion of a document, an image, or a stored string of characters. Content nodes 302 may reference physical objects or virtual objects.

Content nodes 302 may be contained in a set of content containers 304. The content containers 304 may provide addressable (or locatable) information through which content nodes 302 can be retrieved. Content containers 304 may contain one or more content nodes 302. For example, the content container 304 of a Web page, addressable through a URL, may contain many content nodes 302 in the form of text and images.

The meanings of content nodes 302 (for example the description, purpose, usage, or intent of the content node 302) may be abstracted using concepts 306. Concepts 306 may describe content nodes 302 or some aspect of content nodes 302. Individual content nodes 302 may be assigned many concepts 306; individual concepts 306 may be shared across many content nodes 302. In some cases, concepts 306 may not be associated with any content nodes at all. These may include concepts 306 representing some meaning without ascribing that meaning to any specific object or content node 302.

In the context of the present invention, concepts 306 may represent "thoughts" and content nodes 302 may, for example, be text, audio, images, or video associated with a thought.

Concepts 306 may be defined in terms of compound levels of abstraction through their relationships to other entities and structurally in terms of other, more fundamental knowledge representation entities such as keywords 308 and morphemes 310. Such a structure may be referred to as a concept definition. Collectively, the more fundamental knowledge representation entities such as keywords and morphemes that comprise concepts are referred to as attributes of the concept.

Keywords 308 may be more atomic units within a concept 306. Keywords 308 may combine with other keywords 308 to create more complex (and more abstract) concepts 306. Therefore the same keyword may appear in many different concepts 306. For example, the concept "Team Sports" may consist of the keywords "Team" and "Sports", and the concept "Water Sports" may consist of the keywords "Water" and "Sports". "Sports" thus may be a keyword for both concepts. The directionality between keywords 308 may also be preserved to partially describe their relationships.

Just as concepts 306 may be broken down into keywords 308, keywords 308 may be broken down further into their most fundamental semantic units, called morphemes 310. Morphemes 310 may be the lowest level of abstraction and represent the most concrete, unambiguous unit of meaning, or semantic unit. For example, "baseball" may be comprised of the morphemes "base-" and "-ball". By understanding how these building blocks may be related and in what directions, they may be combined into increasingly more complex structures. In this way, all the possible concepts in the domain may be related.

A special category of content nodes 302, referred to as labels (often called "terms" in the art of classification) may be joined to each knowledge representation entity. Each entity in the faceted data set may have a label. The label may be a simplified name, descriptive word or phrase that may be used to identify an entity. Labels are distinct from the respective entities they describe. Labels may simply help make the various entities discernable to humans. The labels assigned to entities are typically drawn from the language and terms presented in the domain.

The labels may not factor into the operations of the automated aspects of the invention, but may have a role in the interaction between the automated aspects and the cognitive agents.

As with content nodes 302, labels may be abstracted from the respective entities they describe in the knowledge representation model. Thus, in FIG. 2 the following types of labels are identified: a content container label 304a to describe the content container 304; a content node label 302a to describe the content node 302; a concept label 306a to describe the concept 306; a set of keyword labels 308a to describe the set of keywords 308; and a set of morpheme labels 310a to describe the set of morphemes 310.

Though certain aspects of the operations and system are described with reference to the above knowledge representation model, those of ordinary skill in the art will appreciate that other models may be used, adapting the operations and system accordingly. For example, concepts may be combined together to create higher-order knowledge representation entities (such as "memes", collections of concepts that make up ideas). The structure of the representation model may also be contracted. For example, the morpheme abstraction layer may be removed such that concepts are defined only in relation to keywords 310.

Relationships

The entity relationships in the input data may emanate from concepts. For example, attributes associated with concepts may be related in a directed fashion (for example broader to narrower), which may be referred to as an attribute hierarchy, linking the associated concepts.

In a domain's attribute hierarchy, each attribute may have zero or more descendants and may have one ancestor (except the root attribute, which has no ancestor).

Generating a Physical Representation of Knowledge

The system of the present invention may require that a data set, for example a faceted data set, that encodes knowledge as "thoughts" and links the thoughts together in a "thought network", be provided to the thought processing means. There are many methods known to those skilled in the art for providing data as an input to a semantic network such as a thought network. The following description provides one representative example of providing a data set as described in PCT application PCT/CA2007/001546.

It should be noted that the generation of a physical representation of knowledge may be provided across one or more domains; that is, the system and method disclosed by the present invention is operable over both single domains and multiple domains.

Figure 3:
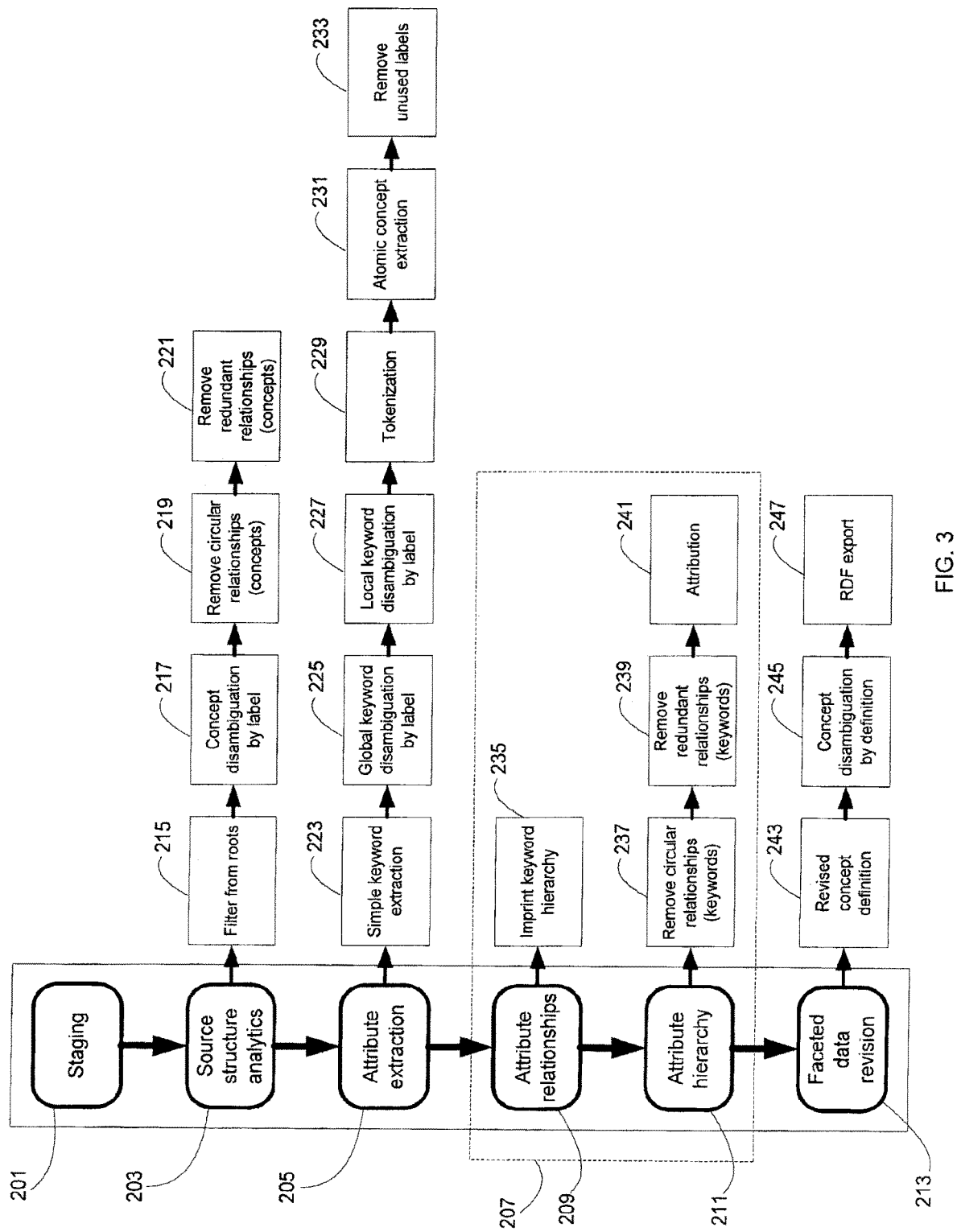
FIG. 3 illustrates one example for the process of knowledge representation, which may in this example be referred to as facet analysis.

FIG. 3 illustrates one example for the process of knowledge representation, which may in this example be referred to as facet analysis. Facet analysis is summarily described below. For simplicity, the knowledge representation model described above will be used to explain the processes involved in facet analysis, however it should be apparent to those skilled in the art that facet analysis, or a similar representation method, may be applied to any knowledge representation model.

Facet analysis may begin by staging 201 a domain, the process of generating a reorganized input structure that represents that collection of data. Depending on the domain, these input structures may embody a range of complexity.

A domain may be, for example, a website comprising several webpages containing an index and library of information. After staging 201, the contents of the website may be represented in a series of overlapping hierarchies (known as a polyhierarchy) that begins with its highest-level (broadest) topics and narrows to its lowest-level (most specific) articles. It could, for illustrative purposes, resemble the following:

People
Places
Things
   Natural things
   Artificial things
   Imaginary things
   . . .

Following staging 201, an analysis process may consist of exploding the information in a staged domain into its fundamental building blocks, then assembling those building blocks into a much smaller data set for use in the thought processing aspect of the present invention. The result, when using the knowledge representation model of the representative example, may be referred to as a faceted data set.

A faceted data set may encode the classification scheme for the domain, which may utilize the knowledge representation model described above. It may inform the thought processing aspect of the present invention of the possible ways in which semantic concepts in a thought network could potentially be related. Considering the implementation described above, wherein a website is represented, the knowledge may be represented as concepts, keywords, and morphemes as follows.

Each object in the domain (for example, articles, links or pictures) may be associated with one or more concepts that give the object some meaning. The directionality of concept relationships may be captured in a hierarchy. For instance, a website may include the entries "Sports→Team Sports→Baseball". Each of these topics may be represented by a concept.

Staging

The purpose of the staging phase may be to configure the import job and then extract, transform, and load ("ETL") the data for use by the analysis tasks that follow. Methods for ETL are known to those skilled in the art. This phase (1) reads data from the data source; (2) translates the raw data into structured data; and (3) stores that structured data in a data storage means. The tools and techniques used for performing these tasks may be dependent on the data source chosen.

Analysis

Analysis may comprise the steps of source structure analytics 203, attribute extraction 205 and attribute hierarchy assembly 207. A representative example is provided based on PCT application PCT/CA2007/001546, and is summarized below for convenience. It should be noted that there are other methods known to those skilled in the art for providing substantially similar results.

After the source data is imported, the source structure analytics 203 phase may be used to analyze and prepare the extracted source data for the later extraction of attributes. This phase may be used to validate and compress the input data using processes, for example removing redundant data, disambiguating concepts based on their shared labels, and removing circular relationships within the data. Such processes are well known in the art.

This helps limit the scope of the input concept relationships to only those of relatively high confidence. For example, relationships that are further removed from the root nodes may be of lower confidence, or relationships may be removed 215 based on context.

Concepts may also be disambiguated 217, that is, concepts with ambiguous labels may be collapsed into the same concept. This may be useful where, for example the implementation utilizing a website, articles share the same label with their parent categories. Disambiguation may comprise: (1) merging or collapsing concepts which share primary labels within the specified relationship sets; or (2) optionally removing alternative labels if they match the primary label of another concept in the relationship set. For further optimization, circular and redundant relationships may optionally be removed 219, 221 or reoriented to eliminate non-hierarchical concept relationships.

Following this process, the extracted data source may be prepared for attribute extraction 205. Using the input concepts as a basis, this phase may create attributes (for example, as keywords) and prepare them for arrangement into an attribute hierarchy. Concepts may be defined by a list of appropriate attributes (for example, as sets of keywords). This process may create 223 one keyword per concept. That keyword may have one label for each concept label. These keyword labels may correspond to concept labels. Alternatively, different labels for a given concept may describe different ideas or aspects of that concept. In this case, a separate keyword may be created for each concept label. Alternatively, these two approaches may be combined. Keywords then may be disambiguated 225, 227 in a similar fashion as concepts may have been disambiguated.

Concept labels may be deconstructed 229 into individual words, which may be removed. This may be accomplished by: (1) beginning with the labels referenced in a previously established index of concept labels; (2) isolating single-word labels from concept labels which are not already tokenized or separated (i.e. those labels not yet present); (3) tokenizing or separating the concept label; and (4) adding the single-word labels (prioritized in order) to keywords that may have been created from the corresponding concepts by the simple keyword extraction process.

Next, new keywords may be assigned to concepts 231 based on labels shared with nearby concepts, thus creating complex concept definitions. Words previously identified in an index of "common words" may be excluded from being added. Finally, unused labels may optionally be removed 233.

Attribute relationships may be extracted and refined 209 by classifying each concept as either simple or complex and creating relationships 235 between keywords associated with simple concepts, skipping over any complex concepts in between. A complex concept may be a concept comprising at least one of: more than a threshold number of words in one or all of its labels; or more than one keyword. Complex concepts may be excluded because there would be less certainty in their keyword relationships.

Next, an attribute hierarchy may be constructed 211. Source structure analytics may be reapplied to the attribute hierarchy to remove circular 237 or redundant 239 keyword relationships. Attribute (for example, keyword) relationships may be pruned and reorganized 241 into strict hierarchies (where each child keyword may have only one parent). A child keyword having multiple parents may have parent relationships severed, and its ancestor relationships may be reorganized.

Finally, attributes may be assigned 213 to concepts based on concept relationships that present in the input source structure. Prior to exporting, concept definitions may be revised 243 such that each of the attributes (for example, keywords in a parent's concept definition are one of the following: (1) found in the child concept definition; or (2) related to a keyword in the child concept definition. If the concept definition does not meet this criterion, then it may be changed 245 so that it does.

The output 247 of the staging and analysis process may be an attribute hierarchy in a format usable by the thought processor. The format may be a plurality of indices or tables. The plurality of tables may include those to store entities (for example concepts comprised of attributes of keywords and morphemes), relationships between the attributes, content nodes and URI references to their source content containers, labels for each entity, and other information that may be useful, for example process metadata.

Thought Processor

The following describes one novel implementation of the thought network aspect of the thought processor, which may be based upon the methods previously described in PCT application PCT/CA2007/001546, but the thought processor of the present invention may be operable with any thought network which could, for example, also be based upon formal concept analysis or facet classification synthesis.

Figure 4:
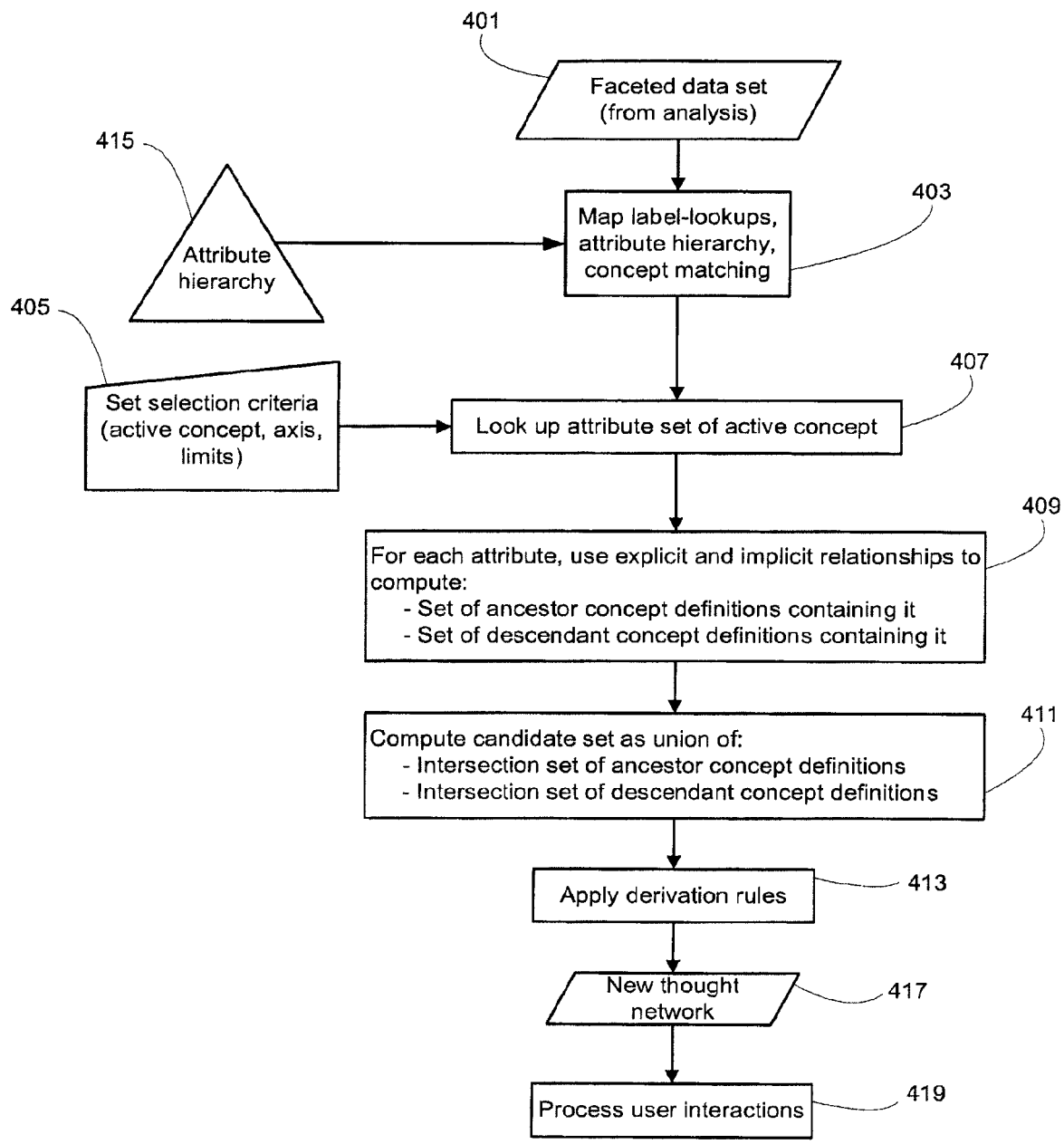
FIG. 4 illustrates one implementation of the thought network synthesis aspect of the thought processor.

FIG. 4 illustrates one implementation of the thought network synthesis aspect of the thought processor.

The thought processor aspect of the present invention may accept as input a data set 401 (for example the faceted data set described above) representing one or more domains as the areas of interest and gather user input to connect new and existing thoughts together. New semantic networks may be dynamically synthesized using aggregations of data sets provided by the knowledge representation aspect of the present invention.

The output of these synthesis operations may be referred to as a dimensional concept taxonomy, representing dimensional concept relationships through the examination of the attribute hierarchy. Methods of accomplishing this are known to those skilled in the art. Such methods include formal concept analysis and faceted classification synthesis. One possible implementation is now described.

On input, each entity (for example concepts, attributes, content nodes, concept relationships, and attribute relationships) in the faceted data set 401 may be given a unique identifier (ID). Given an entity ID the corresponding label can be determined. From a concept ID, any of the following may be determined: ID list of attributes corresponding to that concept; count of attributes corresponding to that concept; ID list of content nodes corresponding to that concept; count of content nodes corresponding to that concept.

After the dynamic synthesis operations, a number of new mappings 403 may be made including basic lookup functions, attribute hierarchy 415, and concept matching. From the label of a concept, attribute or content node, a list of all the other entities of the same type with the same label may be determined. For each attribute, the set of concepts containing it may be computed, so that from an attribute's ID, the quantity and a list of IDs of that attribute's ancestors, descendants or siblings may be generated. Additionally, given the ID of an attribute or a content node, the quantity and a list of IDs for concepts associated with that entity may be determined. Similarly, given a count of attributes in an attribute set, the quantity and a list of IDs for concepts having attribute sets of that size may be generated.

A user may be presented a user interface enabling the input of one or more parameters to direct the synthesis 405, for example domain, active concept definition, axis definition, and optional limiting parameters to constrain the scope.

User Inputs

Figure 5:
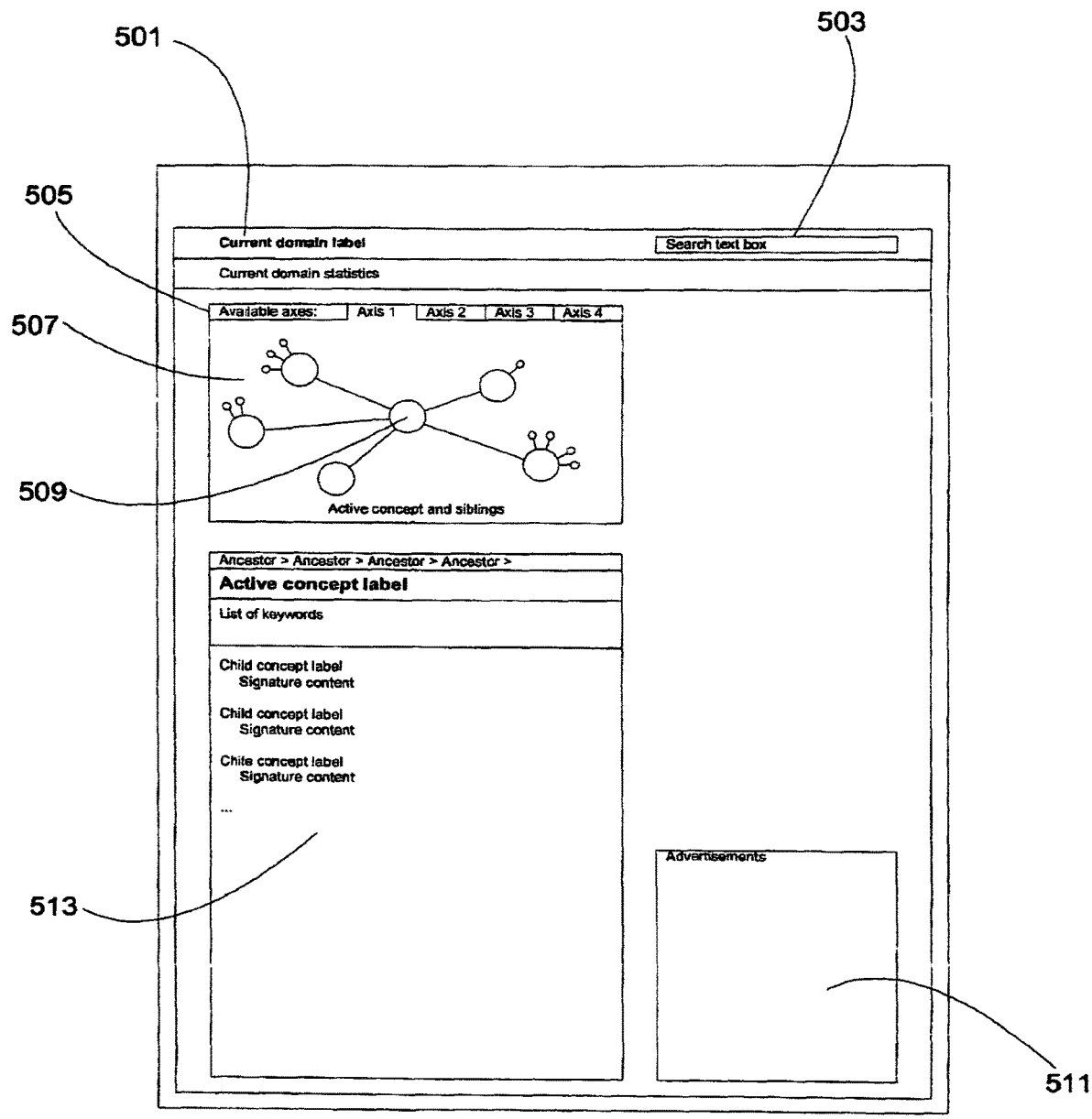
FIG. 5 illustrates one aspect of a user interface provided by the present invention.

FIG. 5. illustrates one aspect of a user interface provided by the present invention.

The inputs provided by the user and the system may include:

Domain 501: the broad field to which the synthesis operations should be applied active concept 503: the starting point axis definition 505: the direction in which to search for related concepts (as either a direction or another point). The axis definition may be specified using a list of one or more attributes of the active concept or of some attributes of other concepts in the domain.

A user may further provide the following parameters using the interface, or these may be provided as set values unrelated to user interactions:

degrees of separation: maximum number of direct hierarchical steps from the active concept to a related concept in the resultant concept hierarchy to progress before stopping. Degrees of separation may include the steps within hierarchical chains of relationships.

output limits: maximum number of related concepts, content nodes or both to find in total before stopping. For example, the user could instruct the synthesis operations to stop after finding the ten closest concepts, regardless of how many degrees of separation exist between them and the active concept.

The user may specify any combination of these through the user interface to the system and the system may return a resultant hierarchy of concepts (output concept hierarchy) as a thought network. The output concept hierarchy may then be the focus of further exploration by the user, or may act as a bridge to yet another series of synthesis operations. The further exploration is further described below under the heading Cognitive Agents. The generation of the output concept hierarchy is now more fully explained.

Candidate Set

Referring back to FIG. 4, the active concept's attribute set 407 may be the starting point for finding the set of concepts from within the specified domain that may be used as candidates for the concept hierarchy that is built. The set of concepts that are related to the active concept, without regard to the nature of the relationship, may be referred to as the candidate set. The candidate set may contain concepts whose attributes are within the specified axis definition and degrees of separation, and which are related explicitly or implicitly, or both, to the active concept.

Each concept in the domain may be defined in terms of its attributes, as part of the input faceted data set. There may be a set of attributes for each concept. Some of the attributes in the domain may be related in the attribute hierarchy. Each attribute may be used as part of the definition of multiple concepts. For each attribute, the application may compute the set of concept definitions which contain it.

The attribute set of the active concept may be examined against the attribute hierarchy in order to find explicitly related ancestor and descendant attribute sets. The attribute sets may be constrained to the specified axis definition. They may also be subject to the specified maximum limits and degree of separation distance.

The candidate set may be determined 409 as follows. Attribute sets which are subsets or which have elements that are explicit ancestors of those in the active attribute set, or both, may be considered as possible ancestor concepts. Within each of these related attribute sets, each attribute may have its own set of matching concepts. The intersection set of these concept sets for a given attribute set may contain that attribute set's matching concepts 411.

A similar process may be conducted using related attribute sets which are supersets or which have elements that are explicit descendants, or both, of those in the active attribute set, representing possible descendant concepts. Here again, the intersection set of the concept sets for a related attribute set may contain that attribute set's matching concepts.

The candidate set may be the union of the intersection sets from all the related attribute sets.

Explicit Relationships

Each attribute may have a set of ancestors, a set of descendants, or both. An explicit relationship may exist between attributes when there is a relationship between them as part of the faceted input data in the attribute hierarchy. This relationship can then be used to establish a relationship between the concepts corresponding to these attributes.

For example, given:

{Attribute 1} is an attribute of "Concept 1"

{Attribute 2} is an attribute of "Concept 2"

An explicit relationship between these attributes, where {Attribute 1} is the ancestor and {Attribute 2} is the descendant If one replaces the attribute {Attribute 1} with its child attribute {Attribute 2} (hereafter, "operation c"), "Concept 1" would have the same attribute list as "Concept 2" and thus there may be a relationship between them. "Concept 2" may be a descendant of "Concept 1."

Similarly, if one instead replaces {Attribute 2} with its parent attribute {Attribute 1} (hereafter, "operation p"), then "Concept 2" would have the same attribute list as "Concept 1" and a relationship may exist between them. "Concept 1" may be the ancestor of "Concept 2."

Implicit Relationships

An implicit relationship may be based on intersecting sets of attributes, derived by adding or deleting one or more attributes from the active concept definition. Using either operation, one may derive the concept definition of a descendant or ancestor. A concept with attributes that are a subset of the active concept may be an ancestor of the active concept. Similarly, a concept with all the attributes of the active concept plus one or more additional attributes may be a descendant of the active concept.

For example, given:

"Concept 1" is the active concept, and has a concept definition made up of two attributes: {A, B}

"Concept 2" has a concept definition made up of three attributes: {A, B, C}

If one adds the child attribute {C} to the "Concept 1" attribute list, then "Concept 1" may have the same attribute list as "Concept 2" and there may be an implicit relationship between the two attribute lists. Therefore "Concept 2" may be a descendant of "Concept 1."

Alternatively, if "Concept 2" was the active concept, one may delete one of its attributes to give it the same attribute list as "Concept 1." An implicit relationship may then exist between the two attribute lists, where "Concept 1" may be an ancestor of "Concept 2."

The set of ancestor attribute sets may then be generated by collecting all the subsets of the active attribute set. These subsets may include those with one fewer attribute than the active attribute set, two fewer attributes, three fewer attributes and so on.

Similarly, the set of descendant attribute sets may be generated by collecting all the supersets of the active attribute set. The supersets may include those with one more attribute than the active attribute set, two more attributes, three more attributes and so on.

A hierarchy of explicit attribute relationships may aid the synthesis operations in determining the attribute relationships that hold in the context of every concept definition in which those attributes present.

Derivations

The candidate set may be determined from attribute sets related to the attribute set of the active concept. Explicitly related elements may be found from the attribute hierarchy in the faceted data set. Implicitly related attribute sets may be implied by set intersections. The additional attributes used to find implicit descendant attributes, while in the domain, may or may not be known to the system.

The active attribute set may be paired with each of the attribute sets associated with the concepts in the candidate set. For each pair, a sequence of set operations may be derived which transforms the active attribute set into its paired set. These operations, referred to as derivations, may define how the candidate concept is related to the active concept.

There may be four derivation operations that can be performed 413 on an attribute set in the process of trying to find related attribute sets. The operation types can be abbreviated as shown in Table 1.

TABLE 1

| | Derivation operation types | |
|---|---|---|
| | To make implicit relationships | To make explicit relationships |
| with ancestors | d: delete an attribute | p: replace an attribute with a parent attribute |
| with descendants | a: add an attribute | c: replace an attribute with a child attribute |

Note that the directionality of all the attribute relationships may need to be consistent within pairs of potential concept relationships. Pairs of attribute sets may have ancestor relationships or descendant relationships between their elements, but may not have both.

The synthesis operations may preserve this directionality by only applying either ancestor operations (p, d) or descendant operations (c, a), not both, to establish a relationship between concepts. This may prevent a concept from having all its attributes replaced with those corresponding to an unrelated concept.

For example, given an active concept with attributes {A, B, C} and a candidate concept with attributes {D, B, G, F}, there may be three axes running through the definition of the active concept corresponding to its three attributes. To determine whether a relationship exists between the concepts, one could first use explicit relationships, for example an explicit relationship from A to D, and another from C to G. (These are both c operations: replacing an attribute with a child attribute.) Finally, using the implicit a operation of adding a descendant attribute (namely F) may result in the active concept's attribute set matching that of the candidate descendant. Therefore one may refer to the candidate as a descendant of the active concept.

To illustrate, when pairing the active and candidate attribute sets, there may be three possible groups of attributes:
    those associated with the candidate set only ("candidate-only" attributes)
    those associated with both the candidate set and the active set ("both" attributes)
    those associated with the active set only ("active-only" attributes)

If transforming the active set to the candidate set requires deleting "active-only" attributes, then the candidate set may be an ancestor of the active set. If the active set is the same as the candidate set, then the candidate set may be a sibling of the active set. If transforming the active set to the candidate set requires adding "candidate-only" attributes, then the candidate set may be a descendant of the active set.

It may not be valid to transform an active set to a candidate set by both deleting "active-only" attributes and adding "candidate-only" attributes, regardless of whether the two original sets already have attributes in common. Such a pair may be deemed to be unrelated. An exception to this may be when attributes in the "only" sets are related in the attribute hierarchy. In such a case, one of two operations may be performed:
    replace an active set attribute with its parent attribute (with candidate sets that are ancestors of the active set); or
    replace an active set attribute with its child attribute (with candidate sets that are descendants of the active set)

The resulting attribute may then be a member of the "both" set.

Those concepts more likely to be important to the user may be given have higher priority.

Each concept in the candidate set may have a unique derivation series connecting it to the active concept. The order in which derivations are sorted and dealt with by the synthesis operations may affect the ordering of concepts in the result hierarchy. The priority of a candidate concept in the hierarchy may be determined according to Table 2.

TABLE 2

| Priority of derivations in determining result hierarchy | | |
|---|---|---|
| | Prevalence in candidate set | Prevalence in domain |
| Explicit operations (p, c) | 1 | 2 |
| Implicit operations (a, d) | 3 | 4 |

The output of this process 417 may be a thought network operable to process user interactions 419, as more fully described below.

Interface Output to the User

Referring again to FIG. 5, in response to the requirements specified in the user's request, the application may return a concept hierarchy 507, built from concepts that may or may not be associated with objects within the domain, related to the user-provided label's active concept and along the axis.

The concept hierarchy may also be used to derive other types of structures and representations, for example bi-directional (associative) relationships between concepts. The user may refer to this concept hierarchy to find concepts related to the active concept they specified. In accordance with the user's interactions with the concept hierarchy, meaningful content can be provided to the user 513.

The derivations may be built into a hierarchical result set. Each node in that hierarchy may represent a concept with an attribute set as its concept definition. Each edge in the hierarchy may represent a single derivation operation.

From within the active domain, the synthesis operations may isolate and return a hierarchy of concepts related to the active concept. The related concepts may branch in both the ancestor (broader) and descendant (more specific) directions from the active concept, along the specified axis and as far as dictated.

Dimensional Structure

In general, concepts and all of their potential relationships may be visualized in terms of a multi-dimensional lattice 509, where the vertices correspond to concepts and the edges correspond to the semantic relations between concepts.

Each of the concepts in the domain may relate to some number of other concepts in that domain, provided the relationship satisfies the synthesis rules as described above. The aggregate of these concepts and their potential relationships, as well as all the multi-dimensional ways to organize these concepts, may be referred to as a dimensional structure.

Axis (Perspective)

In performing synthesis operations, one particular hierarchy of concepts, the direction and extent of which is defined by the axis definition, may be isolated from within the dimensional structure. This may limit the dimensionality of the original lattice to material of interest, thus making it more comprehensible.

A dimensional axis may represent a distinct hierarchy of concept relationships. This hierarchy may represent a slice through two points in the domain space. Like concepts, axes may be defined in terms of attributes. As such, an axis may be specified using two concepts, one of which may be the active concept. This may constrain the set of ancestors that may link to the active concept.

For example, if the domain is "Motor Vehicles", and the active concept is "my car" which has attributes {grey, Jetta™, mine}, the axis definition could be {grey}, leading to a hierarchy of all vehicles that are grey. Or the axis definition could be {Jetta™}, resulting in a hierarchy of all vehicles that are Jettas™. Or the axis definition could be {mine}, and the hierarchy may be of all vehicles that are owned by me.

Concept Hierarchy

A complex concept may be related to many other concepts in the domain. There may be required a determination of exactly how they are related. Under the system of the present invention, the user may select a domain, active concept definition and active axis definition, and then direct the application to find a set of related concepts.

The result may be a concept hierarchy related to the active concept. The maximum number of relationships found may also be limited by user-specified parameters. For example, the user may constrain the concept hierarchy to a certain number of concepts, or a certain number of content nodes categorized by the concepts. Concept relationships may be hierarchical, directed from broader (parents or ancestors) down to more specific concepts (children or descendants).

For example, one hierarchical branch may be {Industries Manufacturing Automobiles}. In this example, the "Industries" concept may be referred to as an ancestor of the active concept, "Manufacturing." Or, if the active concept is "Manufacturing", a descendant may be "Automobiles." Concepts can have zero, one or more ancestors or descendants, or both. Note that in a strict hierarchy, all of the attributes of higher, broader concepts may be inherited by concepts further down the hierarchy. For example, the "Manufacturing" concept may inherit all the attributes of the "Industries" concept.

Tree Structure

The concept hierarchy described above is based on an examination of all the concepts' attributes. A tree structure may be a concept hierarchy where only a subset of the attributes of the active concept is used as the actionable portion of the synthesis operations. The attributes outside of the subset may be ignored. For example, in inferring the organization chart for a company, only those attributes flagged as job titles may be used in a tree structure.

Dimensional Concept Taxonomy

It is possible that some of the possible relationships in the dimensional structure of a given domain will not be of interest to users. Users may be only interested in the particular concept hierarchies that result from the dynamic synthesis operations which they specify.

Over time, the concept hierarchies built for a particular domain may be connected together, forming a subset of the domain's dimensional structure. This subset may grow into a dimensional concept taxonomy comprising that part of the dimensional structure that is of interest. These collections of concept hierarchies may comprise a more extended thought (semantic) network.

Furthermore, as users create these dynamic hierarchies of information, results may be saved and combined into one or more larger and comprehensive dimensional concept taxonomies. Thus, each dimensional concept taxonomy may provide a holistic overview of some or all of the perspectives that one or more users wish to bring to bear on a subject. This taxonomy may have long-term value to users as a knowledge-base of their activities, for their individual and personal use or to be shared with other users.

Virtual Concepts

In some cases, the attribute set at a concept hierarchy node may have no matching concepts. A virtual concept may be used as a placeholder to indicate this.

For example, given an attribute set {A, B, C}, if there is:

an explicit relationship A→D an explicit relationship D→F no concept with a {D, B, C} attribute set then {F, B, C} may be in the candidate set with one degree of separation from {A, B, C}. If {D, B, C} attribute set has no corresponding concept, there may be a virtual concept at this node in the hierarchy.

Virtual concepts are more fully described in PCT application PCT/CA2007/001546.

Cognitive Agents

The present invention may provide a means whereby cognitive agents, which may be people, machine-based expert systems, etc., may provide the inputs of pattern recognition and selection that may refine and optimize thought networks over time.

Other alternatives for cognitive agents include (but are not limited to): machine learning; feedback data; and web site analytics. For example, RSS feeds may be provided as the source material for new 'thoughts'. RSS fields, which are known to those skilled in the art, contain text strings that may be mapped to a process to translate the string to a concept, for example the one described below. These in turn could be used to seed new thoughts into the system.

Label-to-Concept Translation

The process by which the system generates a set of corresponding concept definitions to apply against the active domain may be referred to as label-to-concept translation (LCT).

The basic operations of label-to-concept translation (LCT) may be applied to enable both human-based and machine-based systems. The operations may be generalized to the task of taking a string and converting it to a concept definition. The string may originate as a query submitted by a person (as an articulation of their thought) or it may be derived from machine-generated sources or previously encoded representations of knowledge (for example documents, data feeds, etc.).

The user may be requested by the user interface to provide a thought 503. The thought may be entered as a word or words recognizable to humans. Thus, the user may be providing a label to the thought processor.

The label provided by the user may be translated to one or more concepts for use with the thought processor. Unlike a conventional search and information retrieval mode of operations that returns a ranked list of possible document matches, LCT may dynamically create a concept definition as a representation of a user's thoughts. This LCT generated concept definition may then be used in synthesis operations to create a semantic network (encoded as a concept hierarchy) as the result of the query. The user's thought may be situated within that thought network providing the user with a context for their actions within the network.

Where more than one concept corresponds to the label, the thought processor of the present invention may be required to present a process by which the user may select the appropriate, or desired, concept to disambiguate the meaning. Optionally, the thought processor may return the corresponding concept definitions in order, from those it deems to be the most relevant to those that are the least relevant. Methods of information retrieval that may be used to identify and retrieve candidate attributes from the domain based on their relevance to the user-submitted query are known to those skilled in the art.

LCT enables a concept definition to be derived from the label. This enables the thought to become integrated with data entities by integrating the thought with the semantic network that is wrapped around it by operation of the present invention.

One example of an information retrieval method is now provided.

To translate a user's query label into a list of concept definitions, the following steps may be taken:
1. The user's query may be tokenized or separated into individual words. For example, the user's query "Love and war" would be tokenized to "Love", "and" and "war".
2. For each tokenized word that is not a stop word (for example "and", "the", etc.), the index may be used to find all the keywords in the domain that have the word in their labels.
3. For each word, its keywords may be ranked and the best may be chosen. For example, a domain may have 9,000 keywords that use the word, "Love". The system may use a reasonable number (for example 10) to present to the user and to create concept definitions.

A set of criteria for ranking a word's keywords may be utilized. One example of a set of criteria may include:
(a) Keywords that exactly match multiple tokenized words. For example, if the tokenized words are "American" and "Albums", then the keyword "American Albums" may rank higher than the keyword "American" or the keyword "Albums".
(b) Keywords that exactly match the tokenized word. For example, the word "Love" may be better-matched by the keyword "Love" than by the keyword "Love in politics".
(c) Keywords that use more than one tokenized word.
(d) Keyword prevalence. Keywords that are used by many concepts in the domain may be ranked higher than keywords used by fewer concepts.

4. Concept definitions may be created, corresponding to the selected keywords. In any concept definition, one and only one keyword from each word may be used (except noise words, and words for which there are no keywords). In any concept definition, each keyword may be used no more than once (even if it maps to more than one tokenized word).

If the user's text query contains unknown words (that is, any words for which there exist no keywords), then a single virtual concept with the user's full text query as its label may be created. It may have no ancestors or descendants. This virtual concept may have one keyword, whose keyword label also matches the query string. This virtual concept may be discarded at the end of the translation process.

For example, if the user's query is "Love and war", and the word "war" is not used by any of the domain's keywords, the system may create a virtual concept with the label, "Love and war". This concept would have one keyword, also with the label, "Love and war". Alternatively, instead of creating virtual concepts for unknown words, the system may be made to instead ignore them.

5. The created concept definitions may be ranked. A set of criteria for ranking concept definitions may be utilized. One example of a set of criteria may include:
(a) Those with the least number of keywords whose labels do not exactly match the tokenized words. For example, if a user's query is "Chess Strategy", then the tokenized words may be "Chess" and "Strategy". A concept definition for example {Keyword 1: "Chess", Keyword 2: "Strategy"} may have no keywords whose labels do not exactly match the words. Another concept definition for example {Keyword 3: "Chess", Keyword 4: "Strategy games"} may have one keyword that does not exactly match a tokenized word. Therefore this second concept definition may rank lower than the first.
(b) Those with the least number of keywords that do not occur together in a real, pre-existing concept definition.
(c) Those with the greatest number of co-occurrences in real concept definitions.
(d) Those whose keywords are more prevalent in the domain. To determine prevalence, the sum of the occurrences of each of its keywords in the domain may be calculated for each concept definition. The sums for each concept definition may then be compared.

If, in a pair of concept definitions being compared, one concept definition has more keywords than the other, then that concept definition's least prevalent keywords may be ignored, so that the same number are being compared from both concept definitions.

(e) Those that match a real concept definition exactly.
(f) Those that may be more simple. That is, concept definitions with fewer keywords may have higher priority.

The concept may then be provided as the active concept to the thought processor, thus enabling the thought processor to provide the user with a hierarchy of related concepts based on the concept definition derived from the label submitted by the user as the query.

Thought Storage

Storage Scheme

Semantic networks in the field of knowledge representation are typically treated as static, permanent structures. In the context of a thought networking system, only the basic building blocks of semantic networks may be required to be stored, such that specific and timely semantic networks may be generated as needed. Thoughts may be stored in a highly compressed data set (the source data, or faceted data set, that comprises the domain). The data may be compressed partly because it may not include the semantic network (specifically, the edges or relationships that constitute the semantic graph), but may only include the nodes (concepts) that can be used as source material for building a semantic network.

Furthermore, the synthesis processes may be configured to acquire source material from any number of domains.

The thought storage aspect of the present invention may provide the means to store faceted data and load it for the thought processor. Storage of data is known to those skilled in the art. One implementation reflecting the knowledge representation model described in PCT application PCT/CA2007/001546 is now described. The data may be organized into three broad areas:

1. Entities: the main building blocks of knowledge representation in the system. Entities may include attributes, concepts, content nodes, and content containers.
2. Entity relationships: representing the relationships between the various entities used in the system. Entity relationships may include attribute relationships, concept relationships, concept-attribute relationships, node-concept relationships, and node-content container relationships.
3. Labels: terms used to describe entities that are separated from the structural definitions of the entities themselves. Labels may include attribute labels, concept labels, and node labels. Labels may be shared across the various entities. Alternatively, labels may be segmented by entity type.

Note that this simplified schema in no way limits the database schema used in any implementation.

Data Encoding

There may be a requirement for transforming something abstract (thoughts) into concrete so that computers (thought processor) and cognitive agents (people) may manipulate them. One example for accomplishing this is now described. A person skilled in the art would recognize that there are many alternative methods to accomplish this.

Faceted output data may be encoded as XML and rendered by XSLT. The faceted output may be reorganized and represented in many different ways. Alternate outputs for representing hierarchies are available.

XSL transformation code (XSLT) may be used to present the presentation layer. All information elements managed by the system (including distributed content if it is channelled through the system) may be rendered by XSLT.

Client-side processing may connect data feeds to the presentation layer of the system. These types of connectors may be used to output information from the application server to the various media that use the structural information. XML data from the application server may be processed through XSLT for presentation on a web page.

In addition to basic publishing and data presentation, XSLT and similar technologies may provide a range of programmatic opportunities. Complex information structures, for example those created by, the system may provide actionable information, much like data models. Software programs and agents may act upon the information on the presentation layer, to provide sophistication interactivity and automation. As such, the scope of invention provided by the core structural advantages of the system may extend far beyond the simple publishing.

Those skilled in the art will also appreciate the variability that is possible for architecting these XML and XSLT locations. For example, the files may be stored locally on the computers of end-users or generated using web services. Client-side scripting languages (or similar technology) may be used to insert the information managed by our system on distributed presentation layers (for example the web pages of third-party publishers or software clients).

As another example, an XML data feed containing the core structural information from the system may be combined with the distributed content that the system organizes. Those skilled in the art will appreciate the opportunities to decouple these two types of data into separate data feeds.

These and other architectural opportunities for storing and distributing these presentation files and data feeds are well known in the art, and will therefore not be discussed further herein.

Classification Scheme Generator

Classification scheme generators are a class of technology used to derive, maintain, and aggregate classification schemes. Within thought networking, a classification scheme may provide a means for knowledge representation.

Various classification scheme generators are known to those skilled in the art. For example, open data projects are generating a proliferation of this kind of data, such that one process is the Internet ecosystem itself. There are many other specific technologies for providing classification data (for example, facet analysis, information extraction, etc.).

The classification scheme generator may provide the raw inputs into the thought networking process, thereby providing suggestions, guidance and inspiration to users in the formulation of new thoughts.

A semantic network, once built, may be used as source material for future iterations of thought networking. In other words, the output of one cycle of thought networking may provide the inputs for another cycle. This may manifest in the maintenance of a semantic network as it evolves over time.

User Interface

Referring to FIG. 5, an interface for a thought processor may be provided to a user, or other cognitive agent, for dynamic synthesis of a thought network. The interface may include tools with which to select an active concept definition, an axis definition, an active domain, and various parameters to direct the scope of the synthesis operations, as discussed above.

A user interface may be operable to enable a cognitive agent to input an active concept. The cognitive agent may first input 503 a text label to the user interface. The text label may be translated to the active concept using the process of LCT described above. Where more than one concept corresponds to the label, the user interface may provide a means for the cognitive agent to select the active concept. Otherwise, the result of the LCT process may return the active concept automatically.

Once the active concept is provided, the resultant concept hierarchy 507 may be displayed to the user as a tree with the central node 509 corresponding to the active concept. The scope of the resultant hierarchy 507 may be constrained. For example, one ancestor level and one descendant level may be shown. Other synthesis parameters (for example resolution) and options (for example displaying more or fewer of the concepts in the result hierarchy, showing or hiding virtual concepts, saving the view, or starting a new domain) may be presented to the cognitive agent as well. The cognitive agent may also be presented with a means by which to configure and edit the active concept 503 and active axis definition 505. The user interface may process the active concept as it would with the previously entered active concept.

Upon the selection of the active concept or a related concept, the user interface may be operable to display signature content (i.e. information related to the selected concept). Signature content may, for example, be the useable and useful content associated with the selected concept. The user interface may also include the features required to implement the classification scheme generator described above. This may include means by which a cognitive agent may enable the reclassification of concepts and content.

In a possible usage of the system of the present invention, where the cognitive agent is a user, the user may navigate an informational domain using the following steps. The user may be presented a means to input an active concept 503, for example through a LCT component as described above. The user may enter or select an active concept. The descendant hierarchy may then be shown branching out from the active concept and a set of possible axis definitions (a "tag cloud") may be displayed 505. Axis labels may be shown in various sizes and shades to represent the density of concepts underneath each, and to express how far away an alternate axis is from the current concept.

The user may enter or select one of the axis definitions 505. The application may display the ancestor hierarchy 507, using the active axis corresponding to one of the tags in the tag cloud. That tag may be displayed as the root 509 of the hierarchy.

The user may continue by selecting another axis definition (by clicking in the tag cloud or entering a new label), active concept (clicking in the tree or entering a new label), resolution or limit and repeating the process.

The hierarchy built may be larger than can be displayed properly in the space-constrained viewing area of a typical output device, for example computer monitor. There may be many possibilities for providing the user with the means to navigate through the result hierarchy. The user could also balance the scope of the synthesis operations against level of detail they seek, by using the resolution parameters (degrees of separation and limit) and successively adding more detail to the resultant hierarchy.

Implementation

The present invention, in one aspect thereof, may be implemented as a computer program. Server application software and databases may execute on both centralized computers and distributed, decentralized systems. The Internet or any other private or public network (for example a company's intranet) may be used as the network to communicate between the centralized servers and the various computing devices and distributed systems that interact with it.

In one aspect of the computer program, the user interface may be provided to a user via a web server that is operable to deliver web pages. The user interface may provide the user a means by which to provide a thought, and be presented with the various labels and axes corresponding to data entities related to the thought. The user may then go through the processes of selection and refinement described above, using the user interface as a means for doing so.

In another aspect of the computer program, the user interface may be provided by client-side software.

The user interface, or front-end, of the present invention may be associated with a server (which may or may not be the same computer as that hosting the front-end) for processing the thought and data set, synthesizing the network, and handling the processes of selection and refinement.

The use of the web server, or client-side software program, and the processing server may provide a means for distributed computing benefits, for example hosted application service provider (ASP) processing models or software-as-a-service (SaaS) application delivery models. Under these models, a third party may offer thought network engine services to domain owners. The domain owner can thus capitalize on the economies of scale that these types of models provide.

The present invention may also be operable over a wireless infrastructure. Present wireless devices are often provided with web browsing capabilities, whether through WAP or traditional means. The user interface of the present invention may be provided to the wireless devices, with processing occurring on the server side of the communication channel or any server associated with such a network.

Further Implementations

There are several useful implementations of a thought network.

Referring to FIG. 5, in one aspect of the present invention, a website implementing a thought network is disclosed. The website may provide a means by which to monetize advertising space 511 to advertisers and advertising networks.

A thought network website may deliver value to advertisers through three basic propositions: (1) content generation; (2) contextual advertisements; and (3) valuable, mass-market audiences.

Additional implementations are also possible for a thought network.

Content Generation

Content generation may facilitate and monetize activities that traditionally have escaped the commercial realm. The present invention may facilitate the completion of a range of activities that used to be poorly supported or unsupported by commercial applications, in an accelerated manner. In particular, the present invention may ease the aggregation and organization of information from different sources in immediately useful ways.

The present invention may create a full paradigm shift in the way people interact with information and use it to catalyze their thoughts and create knowledge. For example, production of vast amounts of new and highly personalized media may be enabled by the present invention.

There is a currently a lack of "content inventory" online in support of online advertising. Two key problems in the online ad market are the lack of quality landing pages and the high price paid by advertisers as a result to place ads on the top websites. This problem is worsening rapidly as the Internet continues to capture an increasing share of interest among advertisers. As a result, advertisers may be seeking quality new content on niche topics and websites catering to the "long tail" (i.e. longer and more specific search queries).

Valuable Mass-Market Audiences

The present invention may cater to the needs of the massive and frustrated audience of users trying to assemble and organize information from various pre-fabricated sources into something that reflects their personal needs. Its natural audience may include the vast segments of knowledge workers, academic and science researchers, students, information architects and library scientists. Additionally, a majority of mainstream web users conduct tasks involving the browsing of numerous websites and combining information, for example to organize travel plans, shop, or dig into any particular topic of interest. The service provided by the present invention may solve the deep-felt problem for these audiences.

Additional Implementations

A thought network may be commercialized in a number of ways, including but not limited to software-as-a-service (SaaS), licensing approaches, data metering, and subscription-based services.

Using SaaS, applications may be provided and priced on a per-user basis. The most up-to-date version may always be provided since the software resides at a centrally controlled location.

Licensing approaches may include providing access to a specific version of an application on a per-user basis. Software updates may also be provided but may require an upgrade fee or the purchase of a new license.

A data metering approach may be provided wherein data is processed and sold as a utility service.

Additionally, a subscription-based approach may be provided wherein access to the thought network application is provided for a fixed term. During this period, usage may be provided on a limited or unlimited basis.

Overview of Consumer-Driven Media Synthesis

The present invention, in another aspect thereof, provides a system, method and computer program that facilitates the dynamic generation of synthesized media through synthesis operations based on a classification system or semantic network, as described above. The present invention enables users to create content in a manner that reflects the way they consume media, easily and in large quantities. The present invention further facilitates the re-use of static data as building blocks for the instantaneous generation of meaningful content based entirely on user input.

Figure 6:
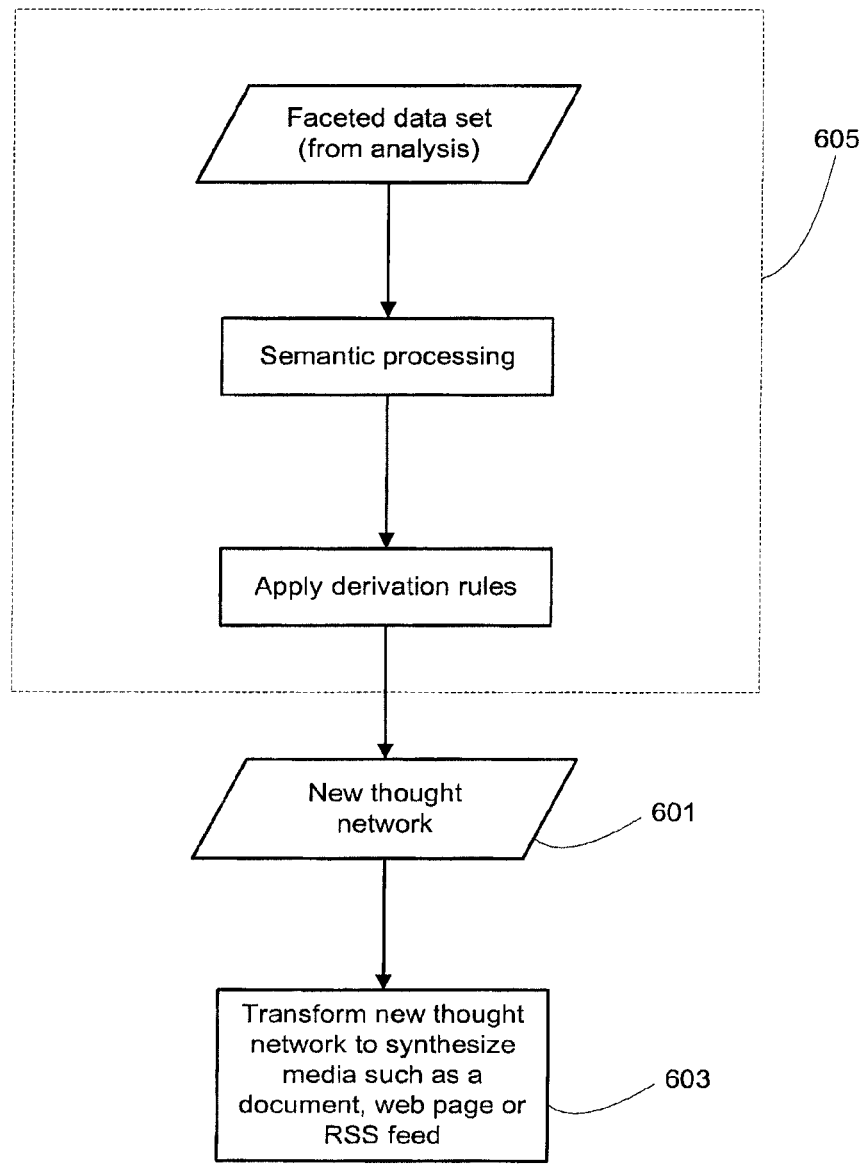
FIG. 6 is a flow chart of the process to transform a thought network to produce synthesized media.

The present invention may function so as to facilitate the creation of consumer-directed semantic networks, or thought networks. As shown in FIG. 6, a consumer-directed semantic network or thought network 601 generated in accordance with, for example, the above processes 605 may be utilized as a structural lattice for the media of the network. The consumer-directed semantic network or thought network 601 may be utilized to synthesize media 603. Schema mapping may be utilized to transform a semantic network or thought network 601 to various document formats. Additionally, semantically-annotated content elements of a semantic network or a thought network 601 may be collated within the structural lattice provided by the consumer-generated semantic network.

The present invention overcomes limitations inherent in the prior art. Consumers that require media, which may be in the form of documents, to be created previously had limited options in light of the prior art. First, a consumer could create media from scratch. This process can be time-consuming. Second, a consumer could utilize prior art media synthesis approaches, which are largely based on existing knowledge representations such as ontologies, documents, or other sources. The scope of the synthesis opportunities are bounded by these existing sources, which also limits the ability for consumers to factor in their own unique and personal expression of knowledge. The present invention overcomes these constraints by enabling individual consumers to direct the creation of the media and its contents, and utilize a machine-media synthesis system to catalyze and accelerate this creation process.

The output of the present invention may be synthesized media that may be of many forms or formats, for example documents, web pages, etc. The synthesized media may be unique to an individual consumer. The media also may draw from a variety of sources and is not necessarily constrained by the boundaries of specific media or media sources, for example particular types of documents or document sources.

Semantic networks and/or thought networks, details of which are provided above, may be applied as a tool to assist in the production of synthesized media. Such networks may be put to many uses. For example, thought networking may address at least three broad classes of activities, including: (1) providing a means to acquire, store, and recall thoughts; (2) providing a means to generate highly personalized, contextualized, and utilitarian thought networks as they are needed to do work; and (3) providing software agents to get those jobs done as they consume the thought networks that have been created. As disclosed herein thought networks may be utilized to navigate websites and to search and retrieve information. Such information may be utilized in the creation of synthesized media.

Figure 7:
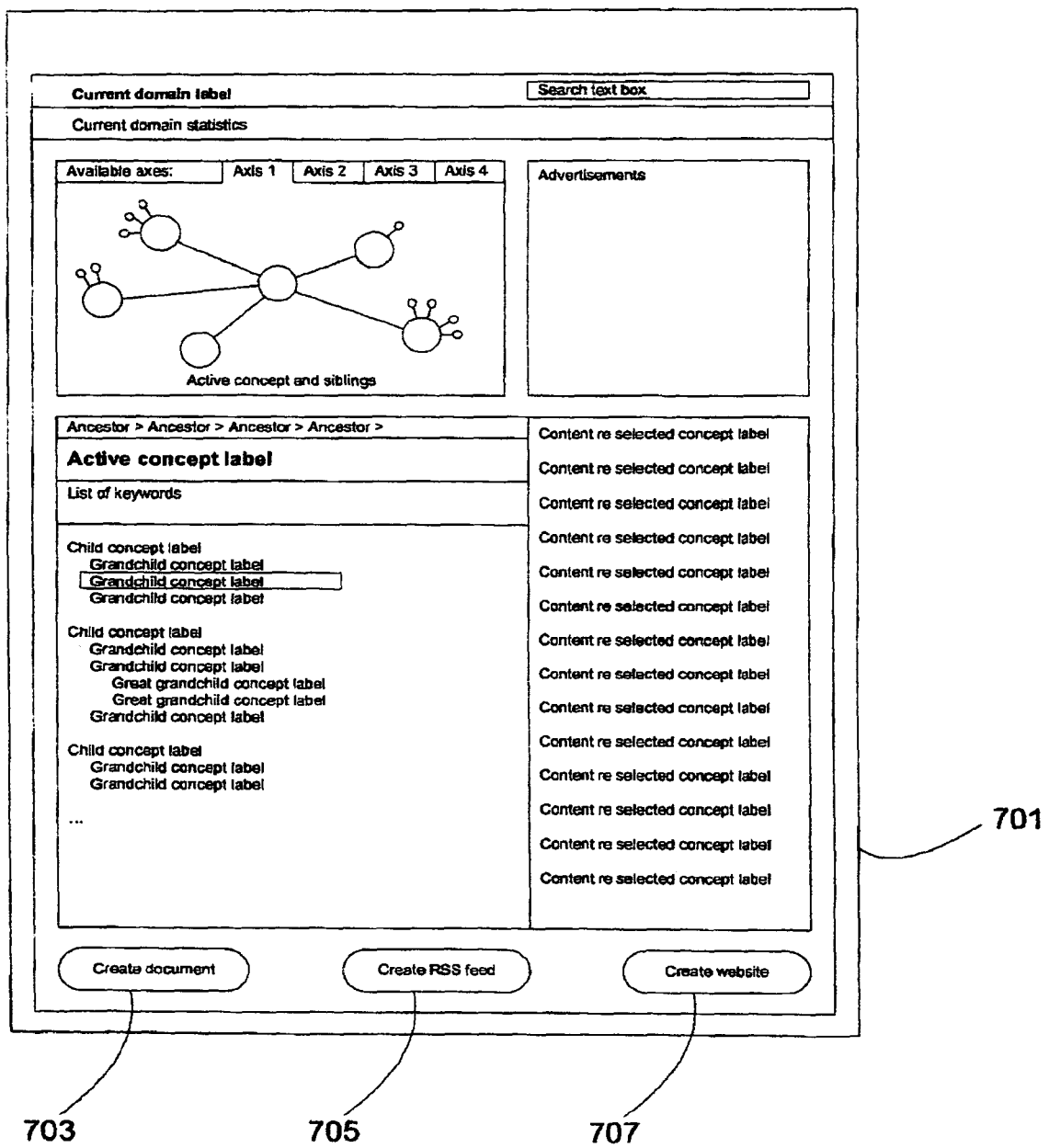
FIG. 7 illustrates a user interface whereby synthesized media may be produced.

As previously described, semantic networks and/or thought networks may be applied to facilitate content generation. Correspondingly, these networks may be utilized to produce synthesized media. The present invention may incorporate software agents as components of the semantic and/or thought networking service. Software agents may operate on the semantic networks (thought networks) created by consumers. The software agents may be created to transform the semantic networks into various types of media, for example websites, documents, RSS feeds, etc. As shown in FIG. 7, a user interface 701 (that may include the inputs and outputs previously illustrated in FIG. 5) may provide a consumer a means to choose a particular synthesized media output format. For example, a consumer may select the synthesized media output to be a document 703, an RSS feed 705, a website 707, or a mix of different media types and media channels. A skilled reader will recognize that other synthesized media output may be offered to a consumer as output choices.

The system may incorporate several elements and steps. A means may be provided whereby consumer-directed networking may create consumer-directed semantic networks. Documents, or other media, may be synthesized in accordance with consumer-directed semantic networks. As semantic networks are formal, machine-readable data structures, such networks can be transformed into a variety of media and document formats using schema maps and transformation technologies, for example XSLT. Data transformations of this type are well known in the art.

Additionally, content elements of the semantic network may be collated within the structure of the semantic network and may be utilized to fill out the contents of the synthesized media. In this context structured, semantically-annotated content may be associated and/or categorized directly within the semantic network. Information retrieval and/or extraction technologies may be utilized to build associations for unstructured or third-party content. Once the content elements are collated within the structure as required for the media provided by the schema transformation, the generated media may be available for the consumer to review, display, export, edit, or utilize in any other manner.

In one aspect of the present invention, media, for example documents, may be generated automatically, without any interaction by a consumer. Automatic generation may be facilitated by utilization of a surrogate measure for the direction that may be provided by the consumer in accordance with other aspects of the present invention. A surrogate measure may include utilizing an existing media source, for example an existing corpus of documents. Through an analysis of the media source any voids in the structure of the media may be identified. For example, if the media utilized is a corpus of documents, there may be documents within the corpus including information regarding a number of countries and voids in the structure may exist for countries that are not represented. Voids may be utilized as a surrogate for the consumer-directed semantic networking. As disclosed herein, since content can also be automatically collated with the semantic network, the document synthesis may proceed in an end-to-end manner whereby it does not involve any consumer interaction or input.

In another aspect of the present invention, synthesized media may be produced in batches through the application of surrogate measures recursively. An aspect of the present invention that facilitates the production of synthesized media in batches may produce a large quantity of media, for example a large number of documents. Each of the media produced may be presented as possibilities or variations of media for consumer selection. A consumer may select media in a variety of ways. For example, media may be published on the World Wide Web (WWW) and may be indexed by, for example, a search engine such as Google™. By utilizing search queries, consumers may select from the batches of specific types of media, for example particular documents, that meet their individual needs or requirements. The selection of media by a consumer ensures that the consumer accesses media that is of the sort that would have been produced by a consumer-directed media synthesis aspect of the present invention.

Figure 8:
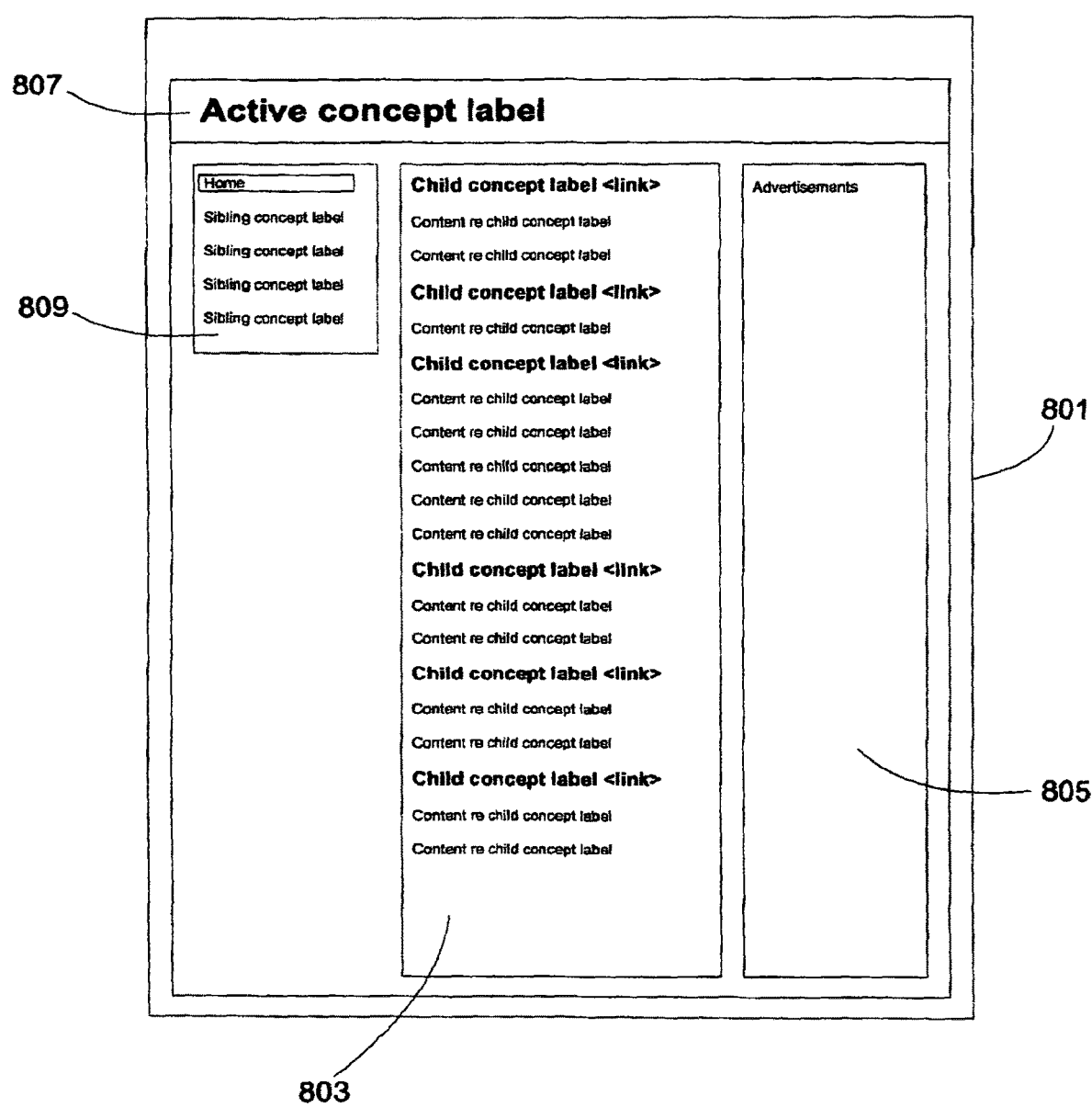
FIG. 8 illustrates a synthesized media output.

Consumer interaction for the purpose of the present invention may involve either direct input by a consumer prior to the production of synthesized media, or selection or choosing of media by a consumer from a batch of synthesized media. A user interface (UI) may be applied as a means whereby consumers may input or select content elements for synthesized media. A UI may also provide a means for consumers to associate content elements within a semantic network. For example, an association may be achieved manually, by explicitly choosing content elements from a categorized list. An association may also be achieved automatically by joining semantically-annotated content elements to nodes within the consumer-directed semantic network. A UI may further provide a means for consumers to select from various online or web-integrable media and document formats. The media formats may be of various types. As shown in FIG. 8 the synthesized media output may be in the form of a webpage. Other outputs may also be generated, for example HTML, RSS, Microsoft™ Word™, PDF, etc. Further outputs may relate to media other than documents, for example audio, video, etc. Consumers may provide their own schema maps to provide for new document formats, style guides, layouts, etc. Consumers may further provide their own information sources for content selection.

The present invention may enable users to create content as they consume media. Through embodiments of the present invention synthesized media may be created easily and may incorporate large quantities of media. The present invention may allow reuse of static data as building blocks for the instantaneous generation of meaningful content based on consumer interactions.

In one aspect of the present invention synthesized media represents transformed semantic or thought networks that may be stored and utilized as a content inventory for monetization purposes. The value of semantic or thought networks may be realized through media synthesis. The synthesized media permits consumer-directed communication which may then be shared with others to facilitate interaction. In this manner, synthesized media may integrate semantic networking within the larger value chain of complementary types of media.

Media synthesis of the present invention may also provide a business marketing and distribution vehicle. Through the production of a variety of media forms it is possible to integrate semantic and thought networks with existing mass market networks. For example mass market networks may include the World Wide Web (WWW), search networks such as Google™, or social networks such as Facebook™. Media integration facilitates the provision of media synthesis services through existing mass market networks.

It will be appreciated by those skilled in the art that other variations of the embodiments described herein may also be practiced without departing from the scope of the invention. Other modifications are therefore possible.

The invention claimed is:

1. A computer-implemented method for synthesizing media using consumer-directed semantic synthesis, the method comprising:
    using at least one computer hardware processor to perform:
        providing semantic synthesis parameters to a consumer via a user interface;
        receiving, from the consumer, a selection of one or more synthesis parameters;
        generating a semantic network based on the selected synthesis parameters and at least one interaction between at least one data entity and at least one concept derived from input by the consumer, wherein the semantic synthesis parameters direct synthesis of the semantic network by constraining the scope and defining the structure of the semantic network, and wherein the generated semantic network includes newly inferred concepts;
        collating content elements within the semantic network;
        displaying representative content elements to the consumer in the user interface; and
        synthesizing media for the consumer using the semantic network, collated content elements, and a format schema mapping.

2. The computer-implemented method of claim 1, wherein the synthesized media includes media selected from the group consisting of one or more web pages, text, one or more images, audio media, and video media.

3. The computer-implemented method of claim 1, wherein the synthesized media includes at least one of a document, an RSS feed, and/or one or more web pages.

4. The computer-implemented method of claim 1, wherein generating the semantic network comprises identifying an active concept based on the input provided by the consumer.

5. The computer-implemented method of claim 1, further comprising storing the synthesized media.

6. The computer-implemented method of claim 1, wherein generating the semantic network includes performing label-to-concept translation.

7. The computer-implemented method of claim 6, wherein the input provided by the consumer includes a string, and wherein performing label-to-concept translation comprises generating a label representing the string and generating, from the label, a representation of a concept.

8. The method of claim 1, wherein the generated synthesized media includes at least one content item selected by the consumer.

9. The method of claim 1, wherein a format of the generated synthesized media is selected by the consumer.

10. The method of claim 1, wherein the input provided by the consumer further includes a maximum number of direct hierarchical steps from an active concept to a related concept in the semantic network.

11. The method of claim 1, wherein said semantic synthesis parameters include one or more of a constraint to a breadth and/or depth of the semantic network, a degree of resolution in the semantic network, and a variation in one or more facets, dimensions, and/or axes of the semantic network.

12. The method of claim 1, wherein synthesizing said media comprises iterating through said semantic network to generate said synthesized media.

13. A system for synthesizing media using consumer-directed semantic synthesis, the system comprising:
at least one computer hardware processor configured to perform:
providing semantic synthesis parameters to a consumer via a user interface;
receiving, from the consumer, a selection of one or more synthesis parameters;
generating a semantic network based on the selected synthesis parameters and at least one interaction between at least one data entity and at least one concept derived from input by the consumer, wherein the semantic synthesis parameters direct synthesis of the semantic network by constraining the scope and defininq the structure of the semantic network, and wherein the generated semantic network includes newly inferred concepts;
collating content elements within the semantic network;
displaying representative content elements to the consumer in the user interface; and
synthesizing media for the consumer using the semantic network, collated content elements, and a format scheme mapping.

14. The system of claim 13, wherein the synthesized media includes media selected from the group consisting of one or more web pages, text, one or more images, audio media, and video media.

15. The system of claim 13, wherein the synthesized media includes at least one of a document, an RSS feed, and/or one or more web pages.

16. The system of claim 13, wherein generating the semantic network comprises identifying an active concept based on the input provided by the consumer.

17. The system of claim 13, further comprising storing the synthesized media.

18. The system of claim 13, wherein generating the semantic network includes performing label-to-concept translation.

19. The system of claim 18, wherein the input provided by the consumer includes a string, and wherein performing label-to-concept translation comprises generating a label representing the string and generating, from the label, a representation of a concept.

20. The system of claim 13, wherein the generated synthesized media includes at least one content item selected by the consumer.

21. The system of claim 13, wherein a format of the generated synthesized media is selected by the consumer.

22. The system of claim 13, wherein the input provided by the consumer further includes a maximum number of direct hierarchical steps from an active concept to a related concept in the semantic network.

23. The system of claim 13, wherein said semantic synthesis parameters include one or more of a constraint to a breadth and/or depth of the semantic network, a degree of resolution in the semantic network, and a variation in one or more facets, dimensions, and/or axes of the semantic network.

24. The system of claim 13, wherein synthesizing said media comprises iterating through said semantic network to generate said synthesized media.

\* \* \* \* \*

UNITED STATES PATENT AND TRADEMARK OFFICE
CERTIFICATE OF CORRECTION

| | | |
|---|---|---|
| PATENT NO. | : 11,868,903 B2 | Page 1 of 1 |
| APPLICATION NO. | : 14/163504 | |
| DATED | : January 9, 2024 | |
| INVENTOR(S) | : Peter Sweeney et al. | |

It is certified that error appears in the above-identified patent and that said Letters Patent is hereby corrected as shown below:

In the Claims

Claim 13, Column 29, Line 41 reads:
"the scope and defininq the structure of the semantic"
Should read:
-- the scope and defining the structure of the semantic --

Signed and Sealed this
Nineteenth Day of March, 2024

Katherine Kelly Vidal
*Director of the United States Patent and Trademark Office*